United States Patent
Noguchi et al.

(10) Patent No.: US 10,531,078 B2
(45) Date of Patent: Jan. 7, 2020

(54) IMAGING APPARATUS, ENDOSCOPE APPARATUS, AND TEMPERATURE-MEASURING METHOD

(71) Applicant: OLYMPUS CORPORATION, Tokyo (JP)

(72) Inventors: Toshiyuki Noguchi, Tokyo (JP); Akihiro Kubota, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 53 days.

(21) Appl. No.: 15/830,237

(22) Filed: Dec. 4, 2017

(65) Prior Publication Data

US 2018/0098061 A1   Apr. 5, 2018

Related U.S. Application Data

(63) Continuation of application No. PCT/JP2015/066465, filed on Jun. 8, 2015.

(51) Int. Cl.
*H04N 7/18* (2006.01)
*H04N 17/00* (2006.01)
(Continued)

(52) U.S. Cl.
CPC ............ *H04N 17/002* (2013.01); *G01K 7/01* (2013.01); *G02B 23/2484* (2013.01); *H04N 5/2256* (2013.01); *H04N 5/353* (2013.01); *H04N 5/361* (2013.01); *H04N 5/378* (2013.01); *G02B 23/2469* (2013.01); *H04N 5/23293* (2013.01); *H04N 2005/2255* (2013.01)

(58) Field of Classification Search
CPC ....................................................... G01K 7/32
USPC ....................................................... 348/65–76
See application file for complete search history.

(56) References Cited

U.S. PATENT DOCUMENTS

6,607,301 B1 *  8/2003  Glukhovsky ......... A61B 1/041
                                                            374/117

FOREIGN PATENT DOCUMENTS

JP   2005-095602 A   4/2005
JP   2007-151594 A   6/2007
(Continued)

OTHER PUBLICATIONS

International Search Report dated Aug. 11, 2015 issued in PCT/JP2015/066465.
(Continued)

*Primary Examiner* — Anand S Rao
(74) *Attorney, Agent, or Firm* — Scully, Scott, Murphy & Presser, P.C.

(57) ABSTRACT

An imaging apparatus includes: an imaging device which is configured to perform a photoelectric conversion of collected light; a selection unit which is configured to select output signals from pixels belonging to a predetermined pixel area of the imaging device; a dark current-calculating unit which is configured to calculate a dark current value based on a difference between the output signals in a predetermined set; a temperature-calculating unit which is configured to calculate a temperature of the imaging device from the dark current value; and an inspection unit which is configured to inspect whether or not a temperature measurement state is normal based on temperatures calculated for a plurality of exposure times for the imaging device by the temperature-calculating unit.

10 Claims, 13 Drawing Sheets

(51) Int. Cl.
*H04N 5/361* (2011.01)
*G01K 7/01* (2006.01)
*G02B 23/24* (2006.01)
*H04N 5/225* (2006.01)
*H04N 5/353* (2011.01)
*H04N 5/378* (2011.01)
*H04N 5/232* (2006.01)

(56) References Cited

FOREIGN PATENT DOCUMENTS

| | | |
|---|---|---|
| JP | 2009-032950 A | 2/2009 |
| JP | 2010-011161 A | 1/2010 |
| JP | 2010-062975 A | 3/2010 |
| JP | 2010-114654 A | 5/2010 |
| JP | 2013-085191 A | 5/2013 |

OTHER PUBLICATIONS

Notice of Allowance dated Apr. 23, 2019 in Japanese Patent Application No. 2017-522763.

* cited by examiner

IMAGING APPARATUS, ENDOSCOPE APPARATUS, AND TEMPERATURE-MEASURING METHOD

This application is a continuation application based on a PCT Patent Application No. PCT/JP2015/066465, filed on Jun. 8, 2015. The content of the PCT Application is incorporated herein by reference.

TECHNICAL FIELD

The present invention relates to an imaging apparatus, an endoscope apparatus, and a temperature-measuring method.

Background Art

Endoscope apparatuses are used in various fields for observing the inside of a space that cannot be directly observed from the outside. Examples of such fields include a medical field in which organs in body cavities are observed, and curative treatments are performed for an organ using a treatment tool as is necessary and an industrial field in which cracks, corrosion, and the like of the inside of facilities such as a boiler, a turbine, an engine, and a chemical plant are observed and inspected. Among endoscope apparatuses, there are endoscope apparatuses each including solid-state imaging devices such as charge-coupled device (CCD) sensors or complementary metal oxide semiconductor (CMOS) sensors as imaging devices at the distal ends of insertion parts inserted into the inside of subjects.

Depending on subjects that are observation targets, there are cases where the temperature of an observation site becomes high. In such cases, there are cases where the temperature of the solid-state imaging devices included in an insertion part of the endoscope apparatus rises. In addition, there are cases where the temperature of the solid-state imaging devices rises because of illumination light that lights a subject. Such a temperature rise causes an increase in the dark current generated in a solid-state imaging device and causes degradation of the image quality of an observed image. When the temperature rises further, there are cases where the solid-state imaging device is broken.

For example, like an endoscope apparatus described in Japanese Unexamined Patent Application, First Publication No. 2007-151594, an endoscope apparatus has been proposed in which a temperature-detecting unit is arranged at a distal end portion of an insertion part, and, in a case where a detected temperature is a predetermined temperature or higher, the detected temperature is reported. However, it is difficult to arrange a temperature-detecting unit in an endoscope apparatus of which the diameter of the distal end portion is small (for example, a diameter of 2 to 4 mm) for the distal end portion. Thus, for example, as described in Japanese Unexamined Patent Application, First Publication No. 2010-11161 and Japanese Unexamined Patent Application, First Publication No. 2009-32950, it has been proposed to estimate the temperature by using a change in the dark current of a solid-state imaging apparatus according to its temperature without an additional temperature sensor being arranged.

SUMMARY OF INVENTION

According to a first aspect of the present invention, an imaging apparatus includes: an imaging device which is configured to perform a photoelectric conversion of collected light; a selection unit which is configured to select output signals from pixels belonging to a predetermined pixel area of the imaging device; a dark current-calculating unit which is configured to calculate a dark current value based on a difference between the output signals in a predetermined set; a temperature-calculating unit which is configured to calculate a temperature of the imaging device using the dark current value; and an inspection unit which is configured to inspect whether or not a temperature measurement state is normal based on temperatures calculated for a plurality of exposure times for the imaging device by the temperature-calculating unit.

According to a second aspect of the present invention, in the first aspect described above, the dark current-calculating unit may calculate a dark current value based on a difference between the output signals in frames as the difference between the output signals in the predetermined set.

According to a third aspect of the present invention, in the second aspect described above, the dark current-calculating unit may calculate a dark current value based on a difference between an output signal value in one frame and an average value of the output signals in a plurality of other frames as the difference between the output signals in the frames.

According to a fourth aspect of the present invention, in the first aspect described above, the dark current-calculating unit may calculate a dark current value based on a difference between the output signals that is output from pixels belonging to partial areas included in the predetermined pixel area as the difference between the output signals in the predetermined set.

According to a fifth aspect of the present invention, in any one of the first to fourth aspects described above, the dark current-calculating unit may calculate a level of a noise component included in the difference from a range of values relating to the difference in pixels and calculates the dark current value based on the level.

According to a sixth aspect of the present invention, in any one of the first to fifth aspects described above, the temperature-calculating unit may calculate a temperature corresponding to the dark current value detected by the dark current-calculating unit as a temperature of the imaging device based on a dark current temperature table representing a relationship between the dark current value and the temperature.

According to a seventh aspect of the present invention, in any one of the first to sixth aspects described above, a device control unit that sets the plurality of exposure times for the imaging device to be longer than an exposure time during imaging may be further included.

According to an eighth aspect of the present invention, in any one of the first to seventh aspects described above, the predetermined pixel area may be an optical black area that is an area in which the collected light is blocked, and the selection unit may select the output signals that is output from pixels belonging to the optical black area.

According to a ninth aspect of the present invention, an endoscope apparatus may include the imaging apparatus in any one of the first aspect to the eighth aspect.

According to a tenth aspect of the present invention, a temperature-measuring method includes: selecting output signals from pixels belonging to a predetermined pixel area of an imaging device performing a photoelectric conversion of collected light; calculating a dark current value based on a difference between the output signals in a predetermined set; calculating a temperature of the imaging device from the dark current value; and inspecting whether or not a temperature measurement state is normal based on temperatures calculated for a plurality of exposure times in the calculating of a temperature.

DESCRIPTION OF EMBODIMENTS

Hereinafter, an imaging apparatus and an endoscope apparatus according to embodiments of the present invention will be described with reference to the drawings.

First Embodiment

Figure 1:
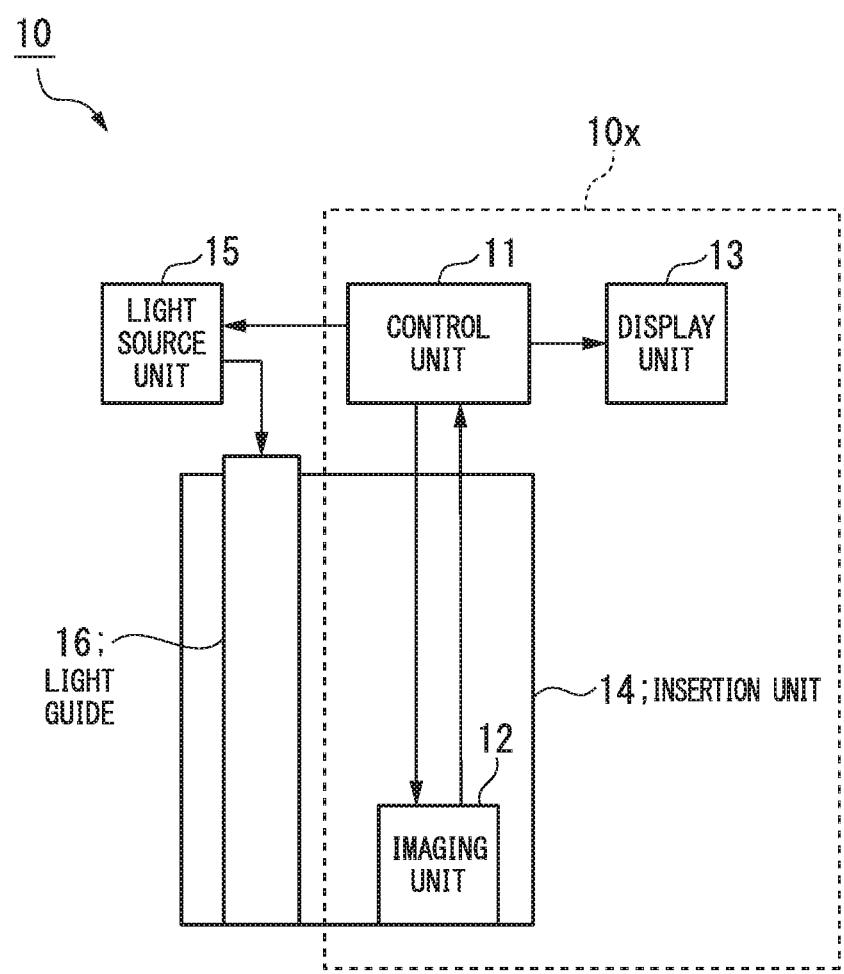
FIG. 1 is a schematic block diagram illustrating an example of the configuration of an endoscope apparatus according to a first embodiment.

FIG. 1 is a schematic block diagram illustrating an example of the configuration of an endoscope apparatus 10 according to a first embodiment.

The endoscope apparatus 10 is configured to include an imaging apparatus 10x, an insertion unit 14, a light source unit 15, and a light guide 16. The imaging apparatus 10x is configured to include a control unit 11, an imaging unit 12, and a display unit 13.

The control unit 11 controls various operations of the endoscope apparatus 10. For example, the control unit 11 generates a light emission control signal used for controlling whether or not light is emitted from the light source unit 15 and outputs the generated light emission control signal to the light source unit 15. In addition, the control unit 11 generates an imaging control signal used for performing exposure toward pixels included in the imaging unit 12 and reading an output signal from each pixel and outputs the generated imaging control signal to the imaging unit 12. Then, the control unit 11 selects output signals from pixels arranged inside a predetermined area used for detecting a dark current value from a pixel area of the imaging unit 12 and detects a dark current value based on a difference between the selected output signals in a predetermined set. The control unit 11 calculates a temperature of an imaging device based on the detected dark current value and outputs a temperature display signal representing the calculated temperature to the display unit 13 as display information.

The control unit 11 generates an image signal based on output signals of pixels arranged inside the pixel area of the imaging unit 12 and outputs the generated image signal to the display unit 13 as display information. The control unit 11 may realize this function by performing a process directed by a predetermined control program. The control unit 11 may configure a user interface by cooperating with an operation input unit (not illustrated in the drawing) and the display unit 13. The configuration of the control unit 11 will be described later.

The imaging unit 12 includes an optical system (not illustrated in the drawing) collecting incident light from an imaging object and an imaging device that includes a plurality of pixels each performing photoelectric conversion of the collected light into an output signal that is an electrical signal. The imaging device, for example, is a CCD image sensor configured to include a photodiode for each pixel, a CMOS image sensor, or the like. The plurality of pixels are two-dimensionally arranged on an imaging surface of the imaging device at a predetermined spatial interval. The imaging surface is orthogonal to the main axis of the optical system and, the incident light collected by the optical system is emitted to the imaging surface. An image of the imaging object is formed on the imaging surface. An area in which the pixels are arranged on the imaging surface is the pixel area. The pixel area includes an imaging area that is an area to which the collected incident light is emitted and an optical black (OB) area that is a light-shielding area in which the collected incident light is not emitted but is blocked. The imaging unit 12 reads an output signal from each pixel based on a control signal input from the control unit 11 and outputs read output signals to the control unit 11.

The display unit 13 displays various images, characters, signs, and the like as display information input from the control unit 11. The display unit 13, for example, displays an image represented by an image signal supplied from the control unit 11, a temperature represented by a temperature display signal, and the like. The display unit 13, for example, is configured to include a display device such as a liquid crystal display (LCD) or an electro-luminescence (EL) display, or the like. In addition, the display unit 13 may be fixed to be detachably attached to the main body of the endoscope apparatus 10.

The insertion unit 14 is configured to include a pipe material having a thin and long shape of which the length in one direction is longer than those in the other directions. The insertion unit 14 has the imaging unit 12 arranged in a distal end portion that is one end in the longitudinal direction and the proximal end (other end) connected to a main body of the endoscope apparatus 10. The distal end portion is a portion that is inserted into or approaches a subject first. Lead wires and the light guide 16 pass through the insertion unit 14 in the longitudinal direction. In both ends of the light guide 16, portions arranged at the distal end and the proximal end of the insertion unit 14 will be respectively referred to as the distal end and the proximal end of the light guide 16. The lead wires are used for the transmission of an imaging control signal from the control unit 11 to the imaging unit 12 and the transmission of a video signal from the imaging unit 12 to the control unit 11.

The light source unit 15 starts (turns on) light emission or stops (turns off) light emission based on a control signal from the control unit 11. Light emitted by the light source unit 15 is incident to the proximal end of the light guide 16 as illumination light. The light source unit 15, for example, is configured to include light-emitting devices such as light-emitting diodes (LED).

The light guide 16 transmits illumination light incident from the proximal end to the distal end thereof. The light guide 16 is configured to include a thin and long member transmitting light, for example, optical fibers. The illumination light transmitted from distal end of the light guide 16 is radiated to illuminate a subject. Reflected light from the subject is incident to the optical system of the imaging unit 12 arranged at the proximal end of the insertion unit 14 as incident light.

Figure 2:
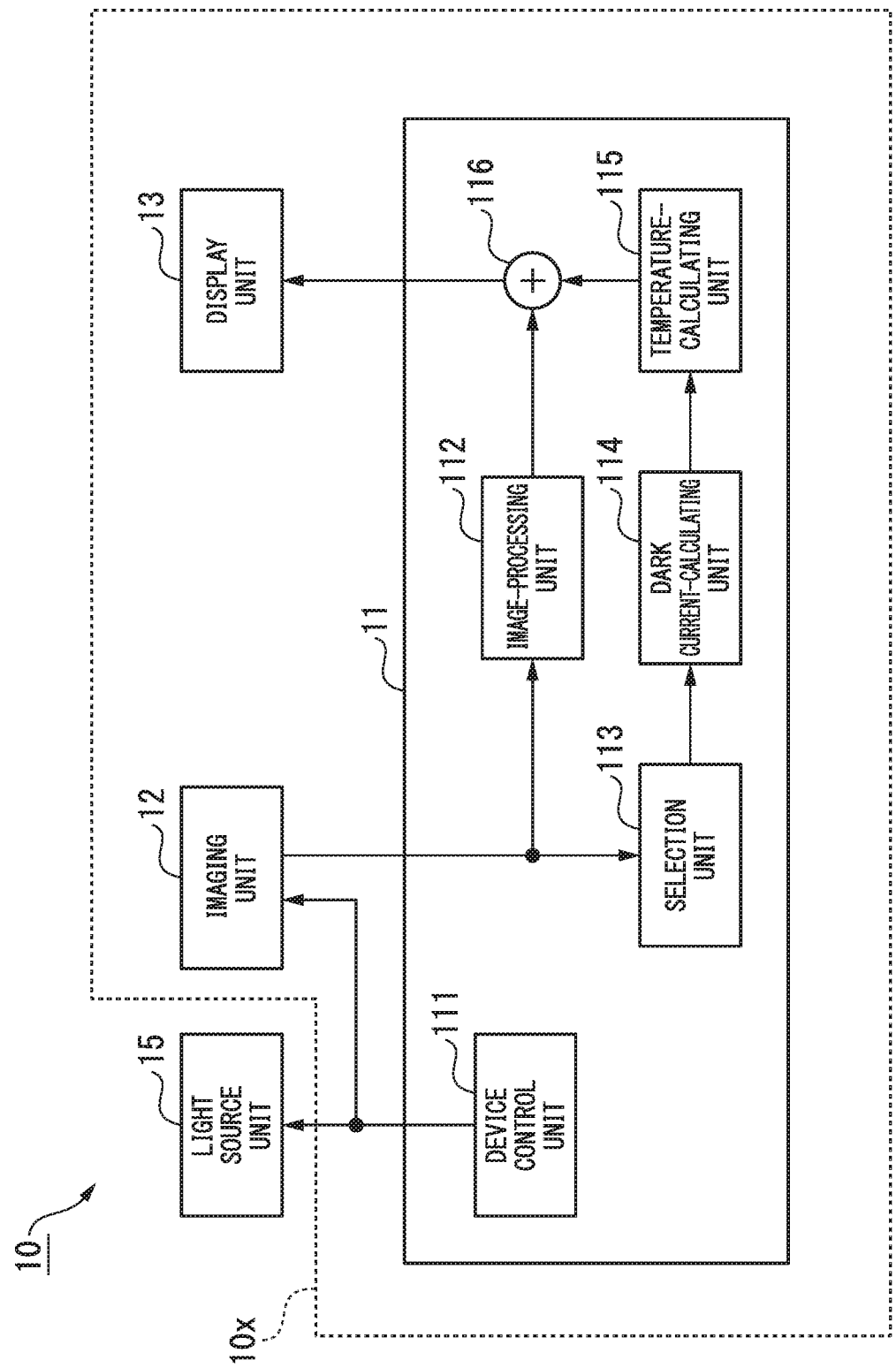
FIG. 2 is a schematic block diagram illustrating the configuration of a control unit according to the first embodiment.

Next, the configuration of the control unit 11 will be described. FIG. 2 is a schematic block diagram illustrating the configuration of the control unit 11 according to this embodiment. The control unit 11 is configured to include a device control unit 111, an image-processing unit 112, a selection unit 113, a dark current-calculating unit 114, a temperature-calculating unit 115, and a superimposition unit 116.

The device control unit 111 generates a light emission control signal representing whether or not the light source unit 15 is caused to emit light in accordance with an operation signal transmitted from the operation input unit (not illustrated in the drawing) and outputs the generated light emission control signal to the light source unit 15. For example, when an operation signal directing light emission is input from the operation input unit, the device control unit 111 acquires an electrical signal having electric power for causing the light source unit 15 to emit light from a power supply (not illustrated in the drawing) and outputs the acquired electrical signal to the light source unit 15 as a light emission control signal. In addition, when an operation signal directing stopping of light emission is input from the operation input unit, the device control unit 111 stops the output of the light emission control signal.

The device control unit 111 generates an imaging control signal used for controlling imaging using the imaging unit 12. The imaging control signal is a control signal used for an exposure time for pixels included in the imaging unit 12 and a timing at which an output signal is read from each pixel. The imaging control signal, for example, is a driving pulse directing pixels arranged in the pixel area of the imaging unit 12 to output output signals in predetermined frame periods for each pixel in the arrangement order (for example, in the order of raster scanning). Each pixel, for example, is configured to include a photodiode having a PN junction in which a P-type semiconductor formed using silicon and an N-type semiconductor are joined together. In accordance with the elapse of time, electric charge accumulates in each pixel. Each pixel releases the accumulated electric charge in accordance with the input of an imaging control signal from the device control unit 111. From the pixel, an output signal representing a voltage generated according to the release of the electric charge is output. Accordingly, in a case where an electronic shutter function is not used, the exposure time corresponds to a frame period (in other words, a reciprocal of the frame rate). In addition, while the accumulation of electric charge in each pixel occurs mainly according to photoelectric conversion of incident light, electric charge is accumulated according to thermal energy also in pixels arranged in an OB section to which incident light is not emitted. A noise component generated according to thermal noise is observed as a dark current and is added as noise to an output signal.

The image-processing unit 112 aggregates signal values represented by output signals of pixels transmitted from the imaging unit 12 for each frame and generates an image signal representing a signal value (pixel value) of each pixel. The image-processing unit 112 performs predetermined image processing for the generated image signal. Examples of the predetermined image processing include a γ correction, a YC conversion, resizing, and the like. The image-processing unit 112 outputs the image signal acquired through the predetermined image processing to the superimposition unit 116.

The output signals of the pixels are input from the imaging unit 12 to the selection unit 113. The selection unit 113 selects an output signal of each pixel arranged inside the OB section as a predetermined area (dark current detection area) used for detecting a dark current value from the pixel area of the imaging unit 12 and outputs the selected output signal to the dark current-calculating unit 114.

The dark current-calculating unit 114, as a difference value between predetermined sets for a signal value represented by the output signal of each pixel input from the selection unit 113, calculates a difference between a signal value of a frame (current frame) at a time point and a signal value of a previous frame (prior frame). The dark current-calculating unit 114 detects a dark current value at the current frame based on the distribution of calculated difference values and outputs the detected dark current value to the temperature-calculating unit 115. A process (dark current-calculating process) for calculating a dark current value will be described later.

The temperature-calculating unit 115 calculates a temperature of the imaging device from the dark current value input from the dark current-calculating unit 114. Generally, the larger the dark current value, the higher the temperature. The temperature-calculating unit 115 may calculate a temperature from the dark current value by performing calculation represented in a predetermined numerical equation or may determine a temperature corresponding to a dark current value by using a dark current temperature table set by the temperature-calculating unit 115 in advance. The dark current temperature table is data including a plurality of sets each formed by associating a dark current value and a temperature. The temperature-calculating unit 115 generates a temperature display signal used for displaying the calculated temperature and outputs the generated temperature display signal to the superimposition unit 116.

The superimposition unit 116 superimposes the image signal input from the image-processing unit 112 on the temperature display signal input from the temperature-calculating unit 115, thereby generating display information.

The superimposition unit 116 replaces a signal value of a pixel included in a predetermined area in an image represented by the image signal transmitted from the image-processing unit 112 with a signal value of a pixel included in the area represented by the temperature display signal, thereby employing the temperature display signal with priority higher than that of the image signal. The superimposition unit 116 outputs the generated display information to the display unit 13.

(Example of OB Area)

Figure 3:
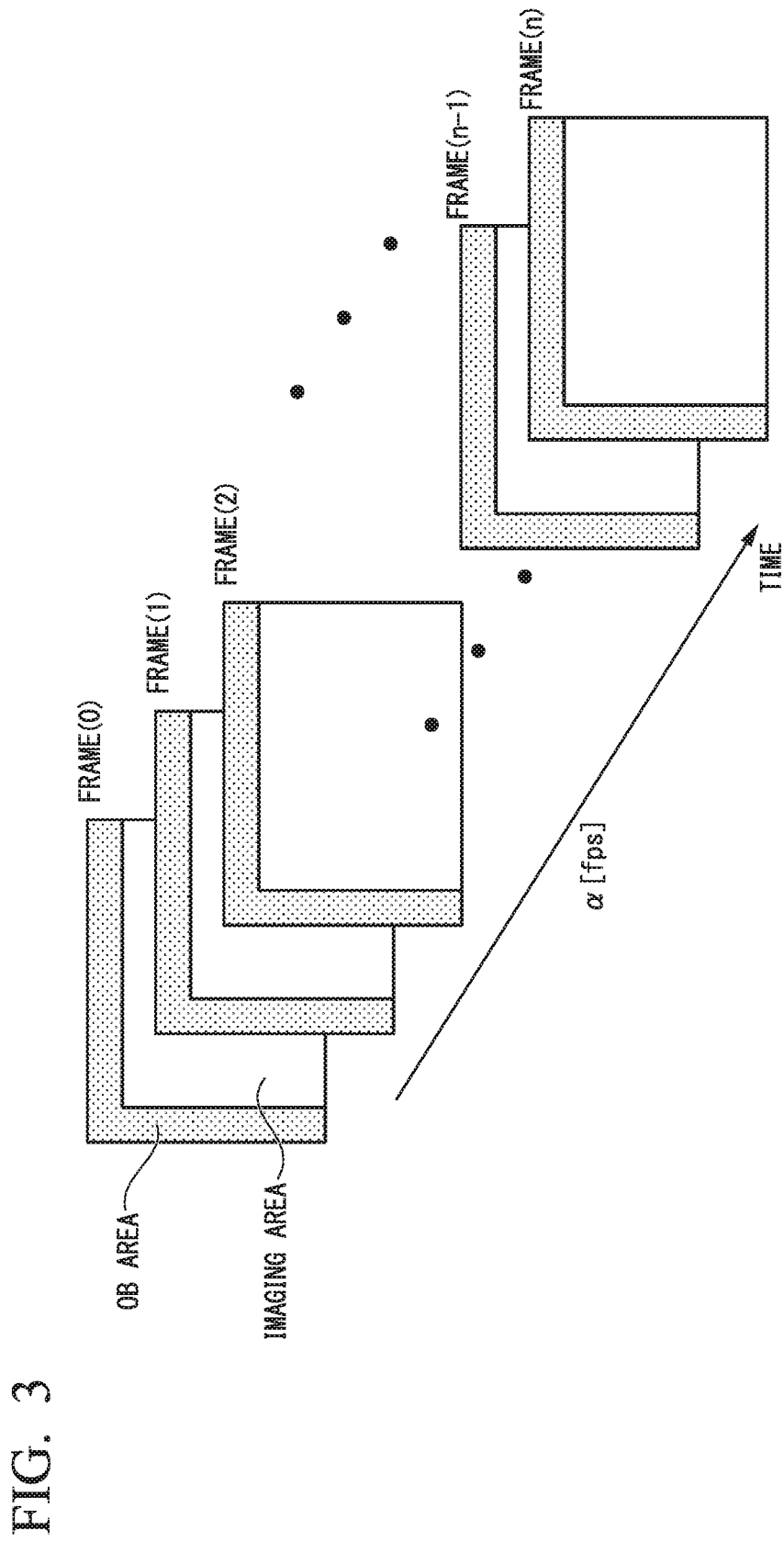
FIG. 3 is a conceptual diagram illustrating an example of an output signal output from an imaging unit according to the first embodiment.

Next, an example of the OB area will be described. FIG. 3 is a conceptual diagram illustrating an example of an output signal output from the imaging unit 12 according to this embodiment. FIG. 3 illustrates that output signals are sequentially acquired at a predetermined frame rate α [fps] for each frame. As illustrated in FIG. 3, each of output signals of frame(0) to frame(n) is represented in a rectangular shape. In addition, in the output signals of each frame, a shaded area of the upper and left sides represents output signals output from pixels arranged inside the OB area, and the other area represents output signals of pixels arranged in the imaging area. In the OB area, according to the configuration of the imaging unit 12, incident light collected by the optical system is constantly blocked. In this embodiment, a dark current value acquired from output signals output from the pixels arranged inside the OB area is used for temperature measurement. In contrast to this, output signals output from pixels arranged inside the imaging area to which incident light is emitted are used for the generation of an image signal in the image-processing unit 112.

(Dependency of Dark Current Accumulated Electric Charge Amount on Temperature)

Figure 4:
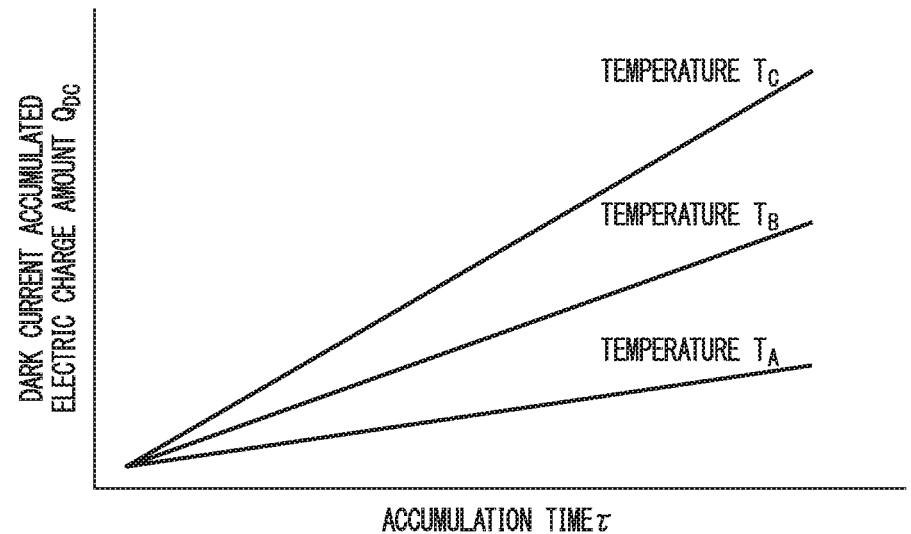
FIG. 4 is a diagram illustrating an example of a dark current accumulated electric charge amount.

Before the principle of temperature measurement is described, a dark current accumulated electric charge amount in a photodiode configuring each pixel will be described. FIG. 4 is a diagram illustrating an example of a dark current accumulated electric charge amount. The vertical axis represents a dark current accumulated electric charge amount $Q_{DC}$, and the horizontal axis represents an accumulation time τ. The dark current accumulated electric charge amount $Q_{DC}$ is approximately proportional to the accumulation time τ. The dark current accumulated electric charge amount $Q_{DC}$ and the accumulation time τ have a relationship represented in Equation (1).

$$Q_{DC} = k\tau \quad (1)$$

In Equation (1), k represents a proportionality coefficient. The proportionality coefficient k depends on the temperature. Generally, when the temperature is higher, the proportionality coefficient k is larger. This means that a dark current increases as the temperature becomes higher. In the example illustrated in FIG. 4, the dark current increases in the order of temperatures $T_A$, $T_B$, and $T_C$. Here, the accumulation time τ is an elapsed time from the time point of starting accumulation of electric charge. In other words, the accumulation time τ corresponds to an exposure time or a frame period (a reciprocal of the frame rate).

(Dependency of Dark Current on Temperature)

Figure 5:
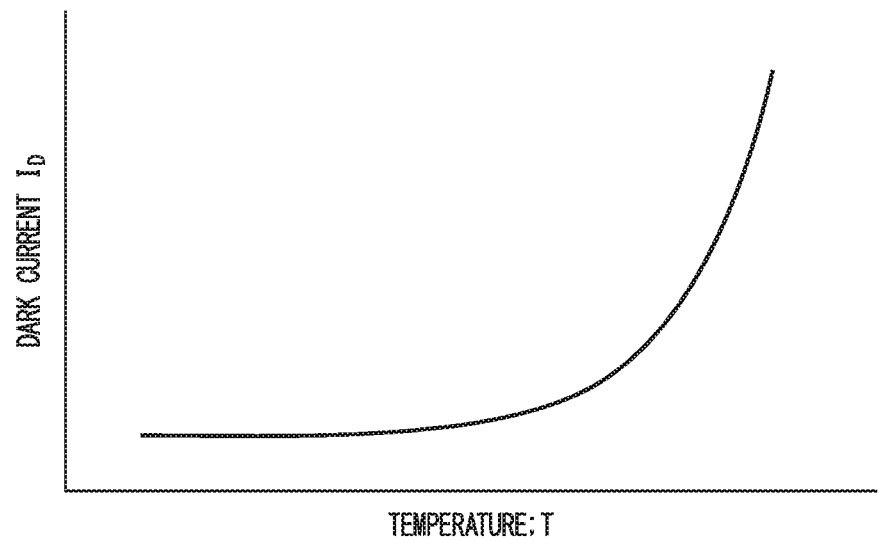
FIG. 5 is a diagram illustrating the dependency of a dark current generated in a photodiode on the temperature.

Next, a dark current generated in a photodiode will be described. FIG. 5 is a diagram illustrating the dependency of a dark current generated in a photodiode on the temperature. The vertical axis represents a dark current value $I_D$, and the horizontal axis represents the temperature T. The dark current value $I_D$ increases exponentially with respect to an increase in the temperature T. The dark current value $I_D$ and the temperature T have a relationship represented in Equation (2).

$$I_D = s \cdot e^{r \cdot T} \quad (2)$$

In Equation (2), s and r are coefficients depending on an imaging device such as the impurity concentration and the structure of a photodiode. For example, in a case where the material of the photodiode is silicon, the dark current value is almost doubled for a temperature increase of 6 to 8° C. Equation (2) can be transformed into Equation (3).

$$T = (1/r) \cdot \ln(I_D/s) \quad (3)$$

Thus, Equation (3) represents that a temperature T can be calculated from an acquired dark current value $I_D$. Thus, in the temperature-calculating unit 115, a dark current temperature table representing Equation (3) or the relationship between the dark current value $I_D$ and the temperature T is set. The temperature-calculating unit 115 acquires a temperature T corresponding to the dark current value $I_D$ input from the dark current-calculating unit 114 by referring to the dark current temperature table. In this way, the temperature-calculating unit 115 can acquire a temperature in a short time through a simple arithmetic operation without performing a complicated arithmetic operation.

(Signal Clamp)

Figure 6:
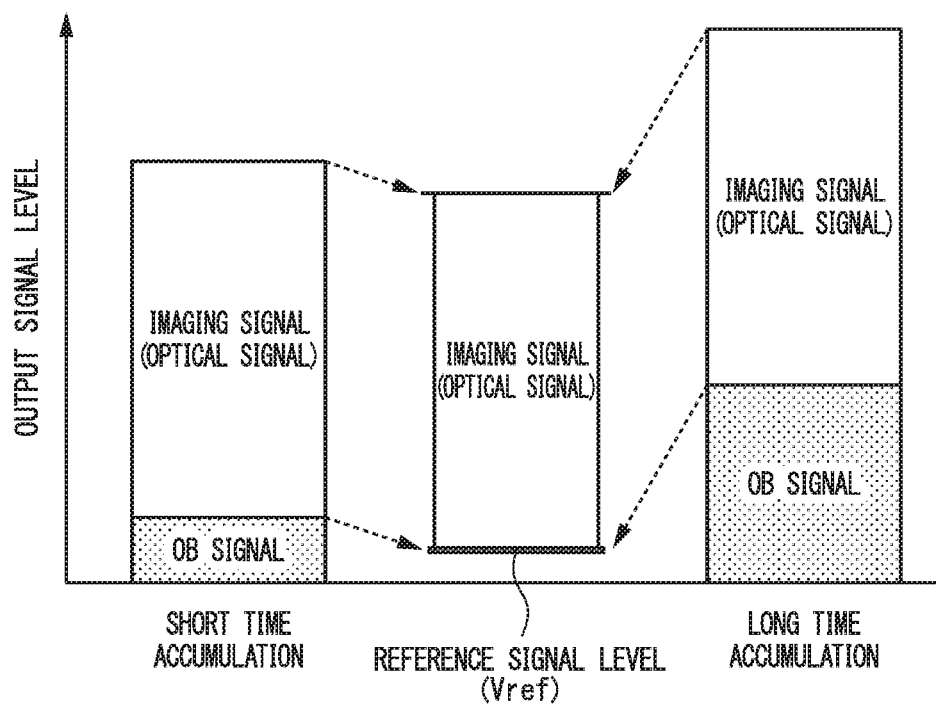
FIG. 6 is a conceptual diagram illustrating a signal clamp.

Next, a signal clamp will be described. FIG. 6 is a conceptual diagram illustrating a signal clamp. The signal clamp is a process for acquiring a component (imaging signal; also referred to as an optical signal) acquired by emission of light by eliminating a component (OB signal) according to an increase in the signal level occurring according to the accumulation of electric charge from an output signal level. In a leftmost column and a rightmost column in FIG. 6, output signal levels relating to a case where the accumulation time is short (short time accumulation) and a case where the accumulation time is relatively long (long time accumulation) are illustrated. As described above, as the accumulation time increases, the accumulated electric charge increases. Thus, the level of the OB signal of a case where the accumulation time is long is higher than the level of the OB signal of a case where the accumulation time is short.

Thus, the image-processing unit 112 performs signal clamp for the output signal of each pixel arranged inside the imaging area, thereby generating an imaging signal. The level of the imaging signal generated for each pixel corresponds to a pixel value. When the signal clamp is performed, the image-processing unit 112 calculates an average value of output signal levels of pixels arranged inside the OB area as the level of the OB signal, subtracts the level of the OB signal from the output signal level of each pixel arranged inside the imaging area, and adds a predetermined reference signal level $V_{ref}$ thereto. The reference signal level $V_{ref}$, for example, is a signal value (pixel value) corresponding to a black level of an image signal. In this way, an error in the signal value occurring according to an increase in the level of the OB signal according to the accumulation of electric charge is eliminated. The signal clamp is also called direct current (DC) fixing or simply a clamp.

(Dark Current-Calculating Process)

Next, a dark current-calculating process according to this embodiment will be described. The dark current-calculating unit 114 calculates a calculation value $V_{CAL}$ that is a difference between a signal value $V_{OUT}$ of the previous frame y and a signal value $T_{OUT}$ of the current frame x for each pixel arranged inside the OB area. The dark current-calculating unit 114 may acquire a value that is obtained by further adding a predetermined offset value to the difference as the calculation value $V_{CAL}$. The offset value may be a value (for example, 1 V) that is sufficiently larger than the level of the OB signal.

The dark current-calculating unit 114 aggregates calculation values $V_{CAL}$ calculated for the pixels arranged inside the OB area and sets a distribution among the pixels. The dark current-calculating unit 114 sets a noise level $N_{CAL}$ of the calculation value $V_{CAL}$ from the set distribution of the calculation value $V_{CAL}$ among the pixels. Then, the dark current-calculating unit 114 calculates a dark current value $I_D$ by using Equation (4) for the set noise level $N_{CAL}$ and a read noise level $N_{RO}$. The read noise level $N_{RO}$ is the level of a read noise mixed into an output signal read from a pixel. A noise level-determining process for determining various noise levels will be described later.

$$I_D = \alpha \cdot (N_{CAL}^2/2 - N_{RO}^2) \quad (4)$$

Equation (4) represents that the dark current value $I_D$ is calculated by multiplying a dark current accumulated electric charge amount $Q_{DC}$ per frame that is acquired by subtracting the square of the read noise level $N_{RO}$ from the value of a half of the square of the noise level $N_{CAL}$ by a frame rate $\alpha$.

Equation (4) is derived based on the relations represented in Equations (5) and (6).

$$N_{CAL} = \sqrt{2} \cdot N_{OUT} \quad (5)$$

$$N_{OUT} = \sqrt{(N_{DC}^2 + N_{RO}^2)} \quad (6)$$

In Equation (5), $N_{OUT}$ represents a noise level of a signal value $V_{OUT}$ of each frame. Equation (5) represents that noise, which randomly occurs in each pixel, of a signal value $V_{OUT}$ of which the average value for each frame is approximately the same among frames is added and is acquired as noise of the calculation value $V_{CAL}$. In the process of calculating the calculation value $V_{CAL}$, even if subtraction of signal values is performed between frames, a noise component is not offset. The noise level $N_{CAL}$ of the calculation value $V_{CAL}$ is $\sqrt{2}$ times the noise level $N_{OUT}$ of each frame. In Equation (6), $N_{DC}$ represents a noise level of dark current shot noise in a photodiode configuring each pixel. Equation (6) is acquired as the dark current shot noise randomly occurring in each pixel and read noise are added to be acquired as noise of the signal value $V_{OUT}$. In addition, the square $N_{DC}^2$ of the noise level of the dark current shot noise corresponds to the dark current accumulated electric charge amount $Q_{DC}$.

Accordingly, in the calculation value $V_{CAL}$ acquired from a difference in the signal value $V_{OUT}$ between frames, the noise components are not offset, and a significant noise level $N_{CAL}$ is acquired. This noise level $N_{CAL}$ is used for calculating a dark current value $I_D$. Meanwhile, by calculating a difference in the signal value $V_{OUT}$ between frames, common noise components between frames such as fixed pattern noise (FPN) components included in an output signal are offset. In the FPN component, for example, there are a white flaw, a black flaw, a linear flaw, vertical and horizontal shading, and the like. For this reason, when the dark current value $I_D$ is calculated, a common noise component is reduced or eliminated between frames, and accordingly, the accuracy of the calculated temperature is improved.

(Noise Level-Determining Process)

Figure 7:
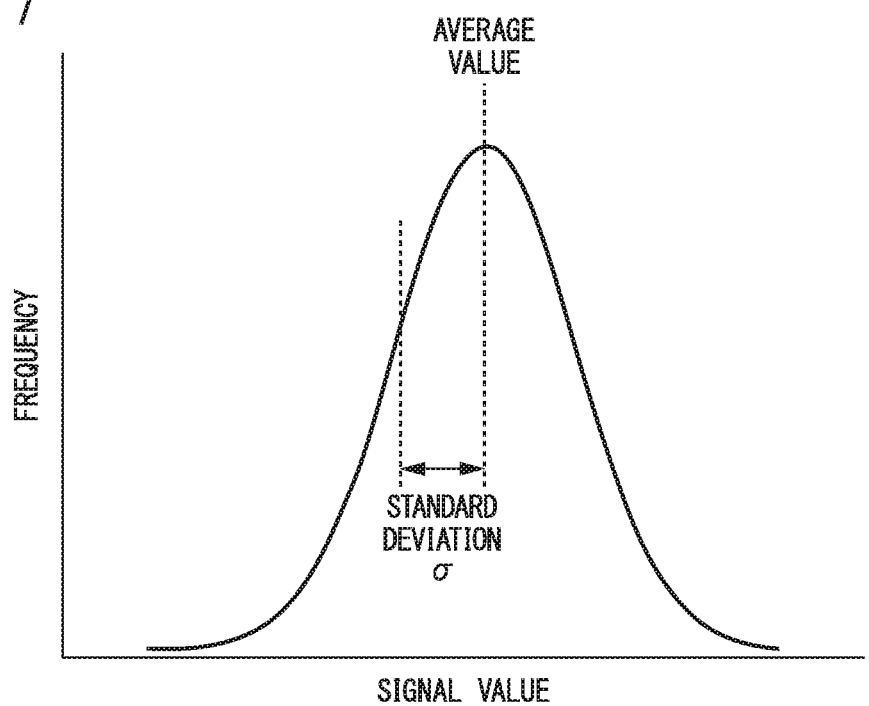
FIG. 7 is a diagram illustrating an example of the distribution of signal values among pixels.

Next, the noise level-determining process will be described. When the noise level $N_{CAL}$ is determined, the dark current-calculating unit 114 acquires a distribution of the calculation values $V_{CAL}$ as signal values among pixels. The distribution of signal values among pixels, as illustrated in FIG. 7, is represented as a frequency (in other words, the number of pixels) for each signal value (or a section thereof). The dark current-calculating unit 114 calculates a standard deviation $\sigma$ of the signal values in pixels as a noise level $N_{CAL}$. The standard deviation $\sigma$ is one index quantitatively representing the magnitude of the distribution of signal values among pixels. In addition, an offset value is a constant value regardless of a pixel. For this reason, the noise level $N_{CAL}$ of the calculation value $V_{CAL}$ acquired by adding the offset value is the same as the noise level $N_{CAL}$ of the calculation value $V_{CAL}$ (a difference value between frames) acquired without adding the offset value. However, the absolute value of the average value of the calculation values $V_{CAL}$ acquired without adding the offset value is smaller than the noise level $N_{CAL}$, and accordingly, measurement of a meaningful distribution of calculation values $V_{CAL}$ in pixels cannot be performed. Thus, the dark current-calculating unit 114 acquires a distribution of calculation values $V_{CAL}$ acquired by adding a value (for example, $3\sigma$ or more) that is sufficiently larger than the standard deviation $\sigma$ in pixels. The dark current-calculating unit 114 can determine a noise level $N_{CAL}$ with high accuracy based on the acquired distribution among pixels.

Figure 8:
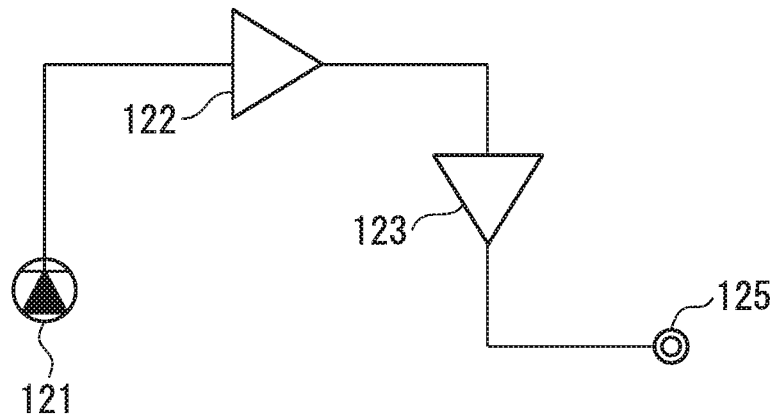
FIG. 8 is a schematic diagram illustrating the configuration of a reading circuit of the imaging unit according to the first embodiment.

Next, the process of determining a read noise level $N_{RO}$ performed by the dark current-calculating unit 114 will be described. The imaging unit 12 includes a reading circuit used for reading an output signal for each pixel. The reading circuit includes, as illustrated in FIG. 8, a photodiode 121 and a pixel amplifier 122 for each pixel and a column amplifier 123 arranged for each column. The photodiode 121 is a light-receiving device that generates an electrical signal by performing a photoelectric conversion and, even in a case where incident light is not incident, generates an electrical signal as a dark current by using thermal energy and accumulates electric charge generated according to the dark current. The pixel amplifier 122 amplifies an output signal from the photodiode 121 and outputs the amplified signal to the column amplifier 123. An output signal for each pixel is output to the selection unit 113 through a terminal 125. While the read noise is added to an output signal of each pixel mainly in the pixel amplifier 122, it is difficult to extract the read noise from the noise of the signal value $V_{OUT}$.

Thus, the dark current-calculating unit 114 acquires a distribution of signal values of amplified signals supplied from the terminal 125 among pixels, reads a standard deviation (see FIG. 7) of the acquired signal values, and calculates the read standard deviation as the noise level $N_{RO}$ of the read noise. The amplified signal is a signal acquired by the column amplifier 123 further amplifying an output signal output from the pixel amplifier 122. The column amplifier 123 is configured to include an amplification circuit provided with an amplification factor variable function, and a sufficiently large amplification factor (for example, a maximum amplification factor in specifications) is set. In such a case, noise added in a section after the column amplifier 123 is small enough to be negligible with respect to the read noise amplified by the column amplifier 123. For this reason, read noise and noise added to the output signal output from the column amplifier 123 can be determined according to the levels thereof. Accordingly, the dark current-calculating unit 114 can determine the noise level $N_{RO}$ of the read noise from the amplified signal supplied from the terminal 125 by using the technique described with reference to FIG. 7.

In addition, there is a possibility that a noise occurring in the column amplifier 123 may be added to an amplified signal output from the column amplifier 123. However, in a case where a CMOS-type imaging device is used in each pixel, as the read noise, a noise from the pixel amplifier 122 is dominant, and the noise level of the noise from the column amplifier 123 is relatively low.

In addition, the dark current-calculating unit 114 calculates the noise level $N_{CAL}$ of the calculation value $V_{CAL}$ for each frame. On the other hand, the dark current-calculating unit 114 does not necessarily need to calculate the noise level $N_{RO}$ of the read noise for each frame. The dark current-calculating unit 114 may acquire the noise level $N_{RO}$ of the read noise in advance based on the amplified signal before capturing an image. The acquisition timing, for example, may be any one of at the time of performing a test operation, at the time of setting a parameter, and the like. By selecting a time point other than at the time of imaging as the acquisition timing, a complicated process such as the adjustment of the amplification factor of the column amplifier 123 at the time of imaging is avoided. In addition, in a normal operation environment (for example, a temperature of 10 to 40° C.), variation in the noise level $N_{RO}$ is negligibly small, and accordingly, a noise level $N_{RO}$ that is set once can be used.

(Temperature-Measuring Process)

Next, a temperature-measuring process according to this embodiment will be described.

Figure 9:
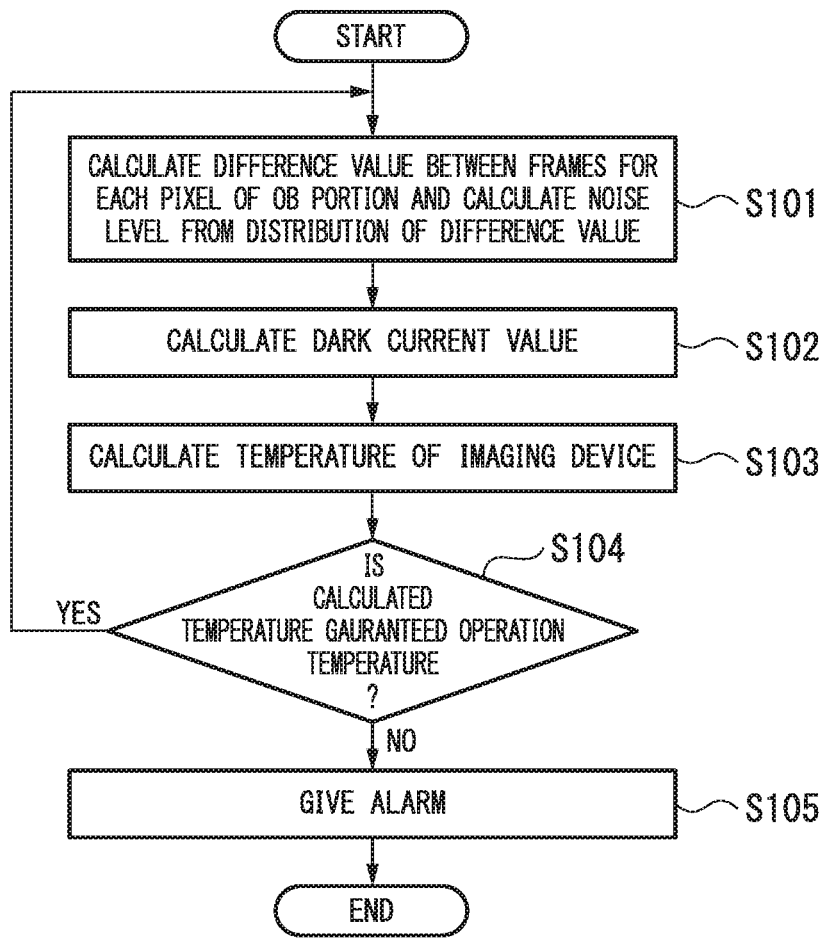
FIG. 9 is a flowchart illustrating a temperature-measuring process according to the first embodiment.

FIG. 9 is a flowchart illustrating the temperature-measuring process according to this embodiment.

(Step S101)

The selection unit 113 selects an output signal of each pixel arranged inside the OB section from among output signals of pixels input from the imaging unit 12. The dark current-calculating unit 114 calculates a difference value $V_{CAL}$ between frames for the selected output signal for each pixel and calculates a noise level $N_{CAL}$ based on the distribution of calculated difference values. Thereafter, the process proceeds to Step S102.

(Step S102)

The dark current-calculating unit 114 calculates a dark current value $I_D$ based on the calculated noise level $N_{CAL}$ and the noise level $N_{RO}$. Thereafter, the process proceeds to Step S103.

(Step S103)

The temperature-calculating unit 115 calculates the temperature of the imaging device from the calculated dark current value $I_D$. The temperature-calculating unit 115 outputs a temperature display signal representing the calculated temperature to the display unit 13 through the superimposition unit 116, thereby displaying the temperature. Thereafter, the process proceeds to Step S104.

(Step S104)

The control unit 11 determines whether or not the temperature calculated by the temperature-calculating unit 115 is within a predetermined guaranteed operation temperature range (for example, 10 to 40° C.). When the calculated temperature is determined to be within the guaranteed operation temperature range (Step S104: Yes), the process returns to Step S101. On the other hand, when the calculated temperature is determined to be outside of the guaranteed operation temperature range (Step S104: No), the process proceeds to Step S105.

(Step S105)

The control unit 11 notifies an alarm representing that the temperature of the imaging device is outside of the guaranteed operation temperature range to the display unit 13 and the like. The control unit 11, for example, displays a predetermined alarm on the display unit 13. The control unit 11 may reproduce a predetermined alarm sound for a predetermined time (for example, for one minute) from a speaker (not illustrated in the drawing). Thereafter, the process illustrated in FIG. 9 ends. Accordingly, a user can be made aware that the temperature of the imaging device is outside of the guaranteed operation temperature range in which a normal operation can be performed.

(Another Example of Calculation of Difference Value Among Plurality of Frames)

In the dark current-calculating process described above, while a case where the dark current-calculating unit 114 calculates the calculation value $V_{CAL}$ that is a difference between the signal value $V_{OUT}$ of the previous frame y and the signal value $V_{OUT}$ of the current frame x for each pixel has been described as an example, the process is not limited thereto. The dark current-calculating unit 114, as represented in Equation (7), may calculate a difference between an average value of signal values $V_{OUT}(i)$ of a plurality of frames i of the past and a signal value $V_{OUT}(n)$ of the current frame n as the calculation value $V_{CAL}$ for each pixel. In addition, a predetermined offset value $V_{OS}$ may be further added to the calculation value $V_{CAL}$.

$$V_{CAL} = V_{OUT}(n) + V_{OS} - (1/k)\Sigma_{i=n-j}^{n-1} V_{OUT}(i) \qquad (7)$$

In Equation (7), j represents the number of frames of the past referred to in each frame. Here, j is an integer or two or more. When the dark current-calculating unit 114 refers to signal values of more frames, the accuracy of the noise level $N_{CAL}$ of the calculation value $V_{CAL}$ can be improved. However, the control unit 11 needs to accumulate signal values corresponding to j frames for a longer period up to the current frame n. In addition, in a case where an average value of j frames is taken, the dark current-calculating unit 114 may perform weighted addition using a different weighting factor for each frame. For example, the dark current-calculating unit 114 may use a larger weighting factor for a frame of time closer in time to the current frame n. In this way, a signal value of a frame of time closer to the current frame is weighted more. Thereafter, the dark current-calculating unit 114, for example, by using Equation (4), calculates a dark current value $I_D$ from the calculated calculation value $V_{CAL}$.

(Control of Exposure Time)

There are cases where the device control unit 111 is directed to perform a temperature measurement in accordance with an operation signal from the operation input unit. In such a case, the device control unit 111 may set the plurality of exposure times longer than an exposure time of a case where imaging is directed in the imaging device configuring the imaging unit 12. For example, in a case where an exposure time relating to imaging is ⅓₀ seconds, the device control unit 111 may set an exposure time relating to the temperature measurement to ⅒ seconds. Here, the device control unit 111 generates an imaging control signal directing a timing for reading an output signal from each pixel in frame periods corresponding to the longer exposure time and outputs the generated imaging control signal to the imaging unit 12. Since the noise level of a noise component included in an output signal from the imaging unit 12 increases in proportion to the accumulated amount of electric charge in each pixel, the accuracy of the dark current value calculated based on the noise level is improved. Furthermore, since the dark current value of which the accuracy is improved is used for calculating a temperature, the accuracy of the calculated temperature is improved.

(Another Example of Dark Current Detection Area)

In the description presented above, while a case where the selection unit 113 selects an output signal of each pixel arranged in the OB area as the dark current detection area has been described as an example, the dark current detection area is not limited thereto. In a case where the device control unit 111 stops the output of the light emission control signal and does not cause the light source unit 15 to emit light, by using the whole pixel area as a dark current detection area, the selection unit 113 may select an output signal of each pixel arranged in the entirety or a part thereof. Since incident light is not emitted to the pixel area, the component of an optical signal according to the photoelectric conversion is not included in an output signal of each pixel. For this reason, output signals of pixels arranged in the entire pixel area or an arbitrary part thereof can be used for the temperature measurement.

In addition, by using a pixel area of which an illuminance (plate face illuminance) is lower than a predetermined threshold of illuminance as a dark current detection area, the selection unit 113 may select output signals of pixels arranged in the pixel area (the area in which an illuminance is lower than a predetermined threshold of illuminance). Here, the selection unit 113 may set an area in which pixels of which an output signal level acquired by eliminating the component of an OB signal through a signal clamp using the image-processing unit 112 is lower than a predetermined threshold of an output signal level are distributed as a dark current detection area. Accordingly, output signals of pixels arranged inside the imaging area also can be used for the temperature measurement without using pixels arranged inside the OB area. Generally, the arrangement and the size of the OB area depends on the optical system and the pixel area of the imaging unit 12 and positional relationships between constituent elements of the endoscope apparatus 10, and accordingly, a delicate adjustment operation is required in the alignment and the like. For example, in a case where the imaging apparatus 10x is installed in an endoscope apparatus, by using output signals of pixels arranged in an imaging area having a low dependency on such positional relationships for the temperature measurement, delicate adjustment operations can be decreased or omitted.

In addition, the imaging unit 12 may include a light-shielding part blocking a part of incident light incident to the optical system, and the selection unit 113 may set a light shielded area, which is an area included in the imaging area, in which incident light is blocked by the light-shielding part as a dark current detection area. The selection unit 113 selects output signals of pixels arranged in the set dark current detection area. According to such a configuration, the selection unit 113 does not need to select output signals of pixels arranged in the OB area, and the temperature measurement can be performed by changing a relatively minor configuration of installation of the light-shielding part.

(Another Example of Configuration of Endoscope Apparatus)

Figure 10:
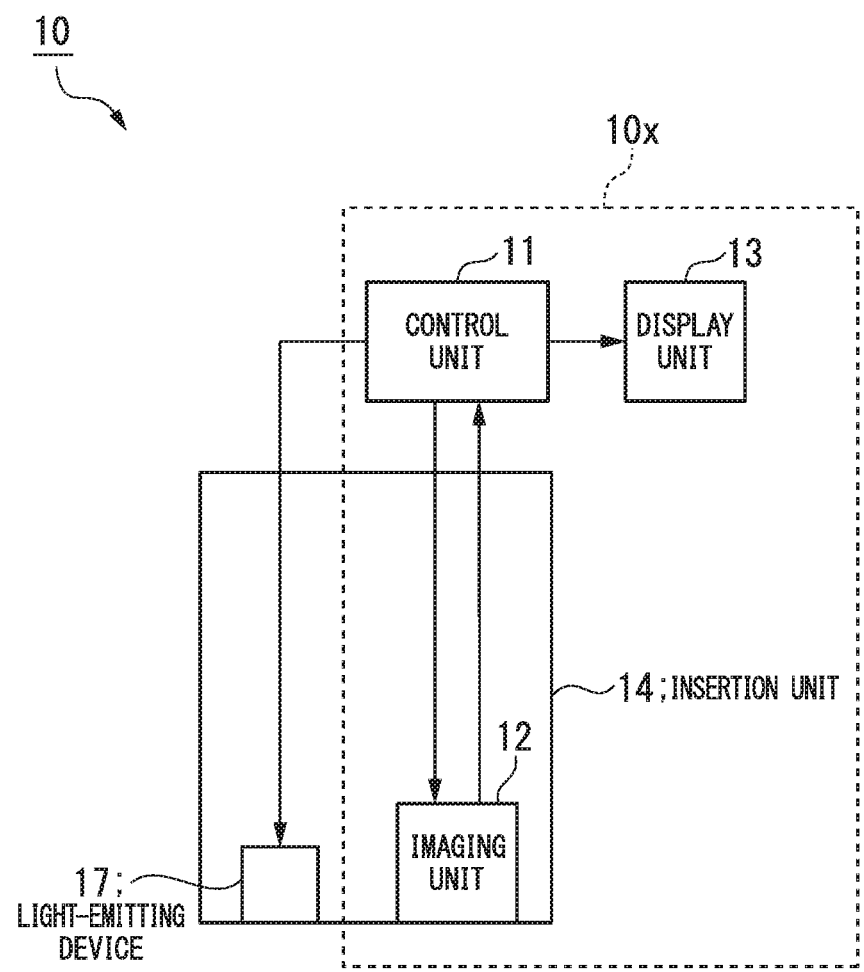
FIG. 10 is a schematic block diagram illustrating another example of the configuration of an endoscope apparatus according to the first embodiment.

While a case where the endoscope apparatus 10 (FIG. 1) described above includes the light guide 16 used for radiating illumination light emitted from the light source unit 15 from the distal end of the insertion unit 14 has been described as an example, the configuration is not limited thereto. The endoscope apparatus 10, as illustrated in FIG. 10, may be configured to include an imaging apparatus 10x, an insertion unit 14, and a light-emitting device 17. The configuration of the endoscope apparatus 10 illustrated in FIG. 10 corresponds to a configuration in which the light source unit 15 and the light guide 16 are omitted, and the light-emitting device 17 is included in the endoscope apparatus 10 illustrated in FIG. 1. The light-emitting device 17 may be a light-emitting device 17 similar to the light-emitting device included in the light source unit 15. In the light-emitting device 17, the start of light emission or stopping thereof is controlled based on a light emission control signal supplied from the control unit 11. The light-emitting device 17 is arranged at the distal end of the insertion unit 14, and a lead wire used for transmitting a light emission control signal from the control unit 11 is arranged in the insertion unit 14. According to such a configuration, similar to the configuration illustrated in FIGS. 1 and 2, the temperature of the imaging device can be measured with high accuracy.

As described above, the imaging apparatus 10x includes an imaging device that performs a photoelectric conversion of collected light and a selection unit 113 that selects output signals of pixels belonging to a dark current detection area as a predetermined area used for detecting a dark current value from a pixel area of the imaging device. In addition, the imaging apparatus 10x includes a dark current-calculating unit 114 that detects a dark current value based on a difference between the output signals in a predetermined set and a temperature-calculating unit 115 that calculates the temperature of the imaging device from a dark current value.

According to this configuration, while random noise components of output signals of pixels belonging to the dark current detection area of the imaging device are not offset in a difference between output signals, common signal components are offset between predetermined sets. Since a dark current value can be calculated with high accuracy based on a noise level depending on a temperature change, the temperature of the imaging device can be measured with high accuracy regardless of the imaging device. For example, in the imaging apparatus 10x, a general-purpose imaging device can be used, and an influence according to a difference between individual imaging devices appearing as a common signal component between predetermined sets is decreased or eliminated.

In addition, the dark current-calculating unit 114 detects a dark current value based on a difference between the output signals in frames as a difference between the output signals in the predetermined sets.

According to this configuration, in a difference between output signals, a common signal component is offset between frames. Since a dark current value can be calculated with high accuracy based on a noise level depending on a temperature change, the temperature of the imaging device can be measured with high accuracy regardless of the imaging device.

The dark current-calculating unit 114 calculates a dark current value based on a difference between an output signal value of one frame and an average value of output signals of a plurality of other frames as a difference between frames.

According to this configuration, common signal components are offset between the output signal value of one frame and the average value of the output signals of the plurality of other frames. For this reason, a noise level depending on a temperature change can be determined with higher accuracy, and accordingly, the temperature of the imaging device can be measured with higher accuracy.

The temperature-calculating unit 115 calculates a temperature corresponding to the dark current value calculated by the dark current-calculating unit 114 as the temperature of the imaging device based on the dark current temperature table representing the relationship between the dark current value and the temperature.

According to this configuration, the temperature-calculating unit 115 can measure the temperature of the imaging device without complicated arithmetic operations.

In addition, the imaging apparatus 10x further includes the device control unit 111 that sets an exposure time for the imaging device to be longer than the exposure time during imaging.

According to this configuration, a noise component that is based on thermal noise included in an output signal increases according to an increase in the accumulated amount of electric charge in each pixel, and accordingly, the accuracy of the dark current value calculated based on the noise level is improved. For this reason, the accuracy of the measured temperature is improved.

The selection unit 113 selects output signals of pixels belonging to the OB area that is an area for which collected light is blocked as a dark current detection area.

According to this configuration, output signals of pixels belonging to the OB area used for temperature measurement and output signals of pixels belonging to the imaging area used for the acquisition of an image signal are acquired in parallel. For this reason, the temperature of the imaging device can be sequentially measured in parallel with an imaging process.

In addition, the imaging apparatus 10x further includes the display unit 13 that displays the temperature.

According to this configuration, the temperature of the imaging device can be known by a user. The user handles the imaging apparatus 10x based on a known temperature, and, for example, an idea for determining whether to continue the imaging process is given.

Second Embodiment

Next, a second embodiment of the present invention will be described. The same reference signs will be assigned to configuration parts the same as those in the first embodiment, and the description thereof will be incorporated by reference.

Figure 11:
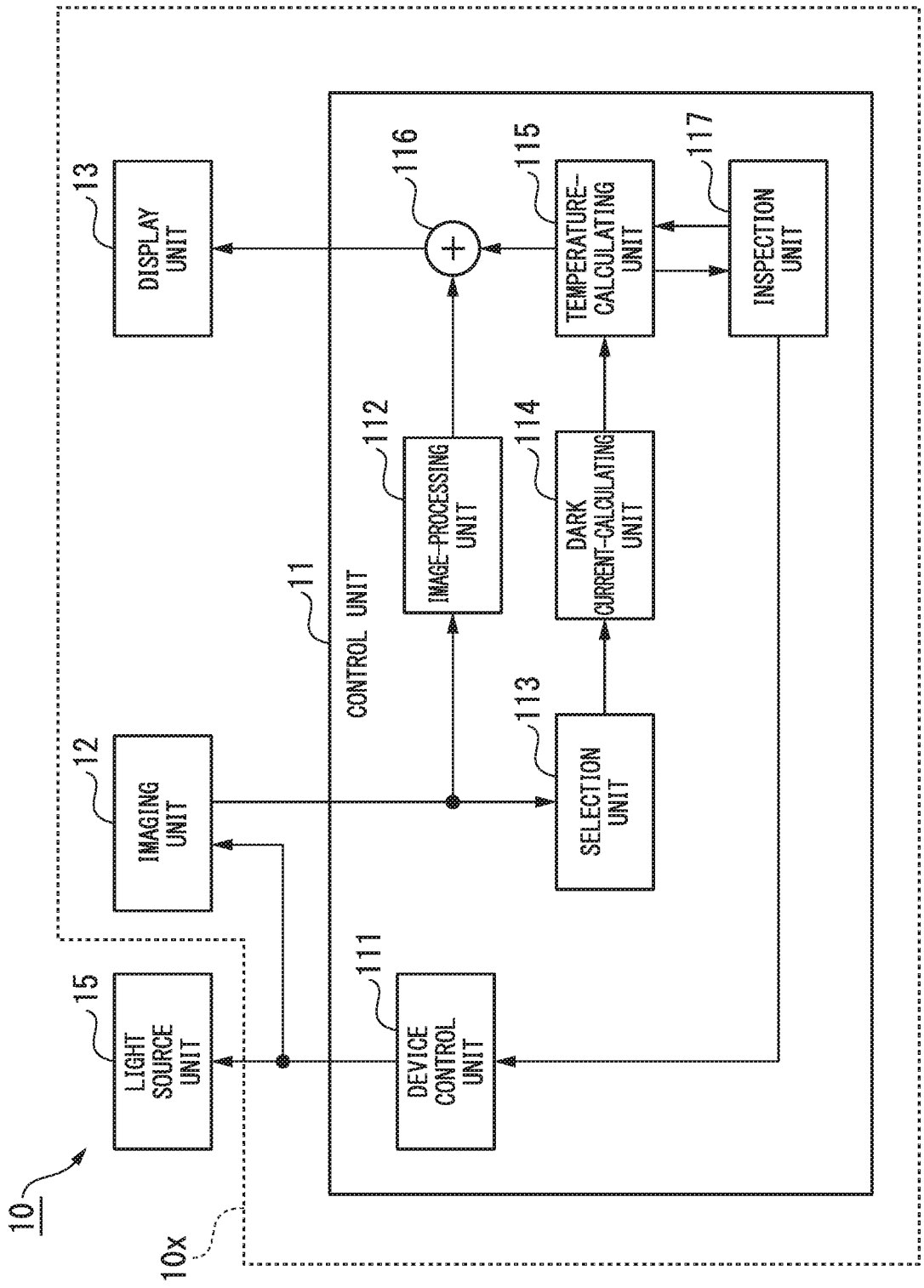
FIG. 11 is a schematic block diagram illustrating the configuration of a control unit according to a second embodiment.

FIG. 11 is a schematic block diagram illustrating the configuration of a control unit 11 according to this embodiment.

In the imaging apparatus 10x according to this embodiment, the control unit 11 further includes an inspection unit 117.

There are cases where the inspection unit 117 is directed to inspect the temperature measurement state in accordance with an operation signal from an operation input unit. In such cases, the inspection unit 117 causes a device control unit 111 to sequentially set a plurality of different exposure times for an imaging device of an imaging unit 12. The inspection unit 117 determines whether or not the temperature measurement state of the imaging apparatus 10x is normal based on a distribution of temperatures calculated by a temperature-calculating unit 115 for the exposure times. The inspection unit 117 determines that the temperature measurement state is normal in a case where the distribution range is smaller than a predetermined threshold of the distribution range and determines that the temperature measurement state is abnormal in a case where the distribution range is the threshold of the distribution range or more. This determination is based on the calculated temperature being ideally constant regardless of the exposure time when the control unit 11 operates normally.

More specifically, the inspection unit 117 outputs exposure time setting signals directed to sequentially set two exposure times $\alpha_1$ and $\alpha_2$ to the device control unit 111. When the exposure time setting signals are input from the inspection unit 117, the device control unit 111 generates imaging control signals relating to corresponding frame periods of the exposure times $\alpha_1$ and $\alpha_2$ and outputs the generated imaging control signals to the imaging unit 12 at different times. The temperature-calculating unit 115 calculates temperatures $T_1$ and $T_2$ of the imaging device based on output signals read for the exposure times α1 and α2 from the imaging unit 12 through the selection unit 113 at each time by using the technique described above. Then, the inspection unit 117 reads the temperatures $T_1$ and $T_2$ calculated for the exposure times $\alpha_1$ and $\alpha_2$ from the temperature-calculating unit 115. Then, the inspection unit 117 determines that the temperature measurement state is normal when the absolute value $|T_1-T_2|$ of a difference between the read temperatures is less than a predetermined threshold $\delta T$ (for example, 0.1° C.). On the other hand, the inspection unit 117 determines that the temperature measurement state is abnormal when the absolute value $|T_1-T_2|$ of the difference between the temperatures is the threshold $\delta T$ or more.

When the temperature measurement state is determined to be abnormal, the inspection unit 117 may cause the temperature-calculating unit 115 to stop the calculation of temperature. In such a case, the control unit 11 may cause one or both of a display unit 13 and a speaker (not illustrated in the drawing) to give an alarm as temperature measurement state information representing an abnormal temperature measurement state. Accordingly, the user can be made aware that the temperature measurement state is abnormal.

(Temperature-Inspecting Process)

Next, a temperature-inspecting process inspecting whether or not a temperature calculated by the temperature-calculating unit 115 is normal will be described.

Figure 12:
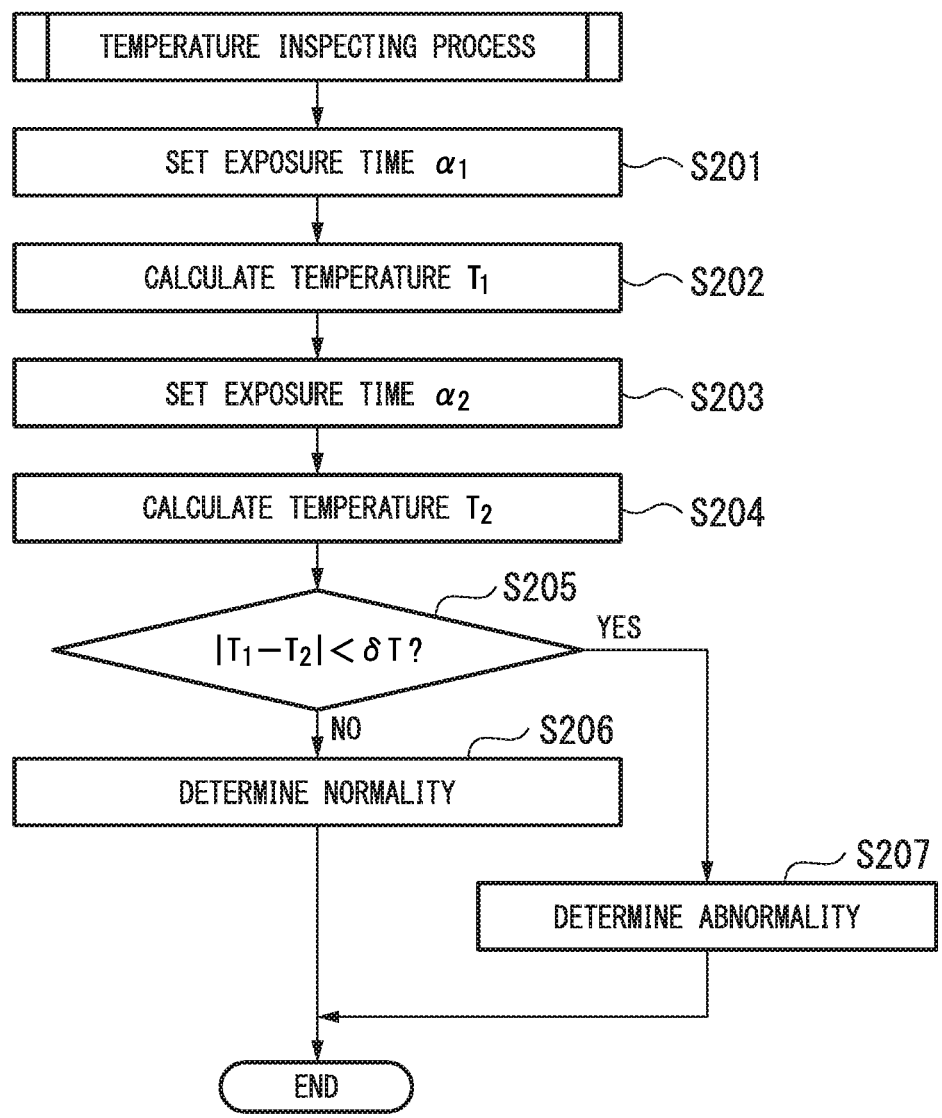
FIG. 12 is a flowchart illustrating a temperature-inspecting process according to the second embodiment.

FIG. 12 is a flowchart illustrating the temperature-inspecting process according to this embodiment.

(Step S201)

The inspection unit 117 outputs exposure time setting signals directed to sequentially setting the exposure times α1 and α2 to the device control unit 111. The device control unit 111 sets the exposure time α1 for the imaging device of the imaging unit 12 in accordance with the input of the exposure time setting signal from the inspection unit 117. Thereafter, the process proceeds to Step S202.

(Step S202)

The temperature-calculating unit 115 calculates a temperature $T_1$ of the imaging device based on an output signal read at the exposure time $\alpha_1$. Thereafter, the process proceeds to Step S203.

(Step S203)

The device control unit 111 sets the exposure time $\alpha_2$ for the imaging device of the imaging unit 12 in accordance with the input of the exposure time setting signal from the inspection unit 117. Thereafter, the process proceeds to Step S204.

(Step S204)

The temperature-calculating unit 115 calculates a temperature $T_2$ of the imaging device based on an output signal read at the exposure time $\alpha_2$. Thereafter, the process proceeds to Step S205.

(Step S205)

The inspection unit 117 reads the temperatures $T_1$ and $T_2$ from the temperature-calculating unit 115 and determines whether or not the absolute value $|T_1-T_2|$ of a difference between the read temperatures is less than a predetermined threshold δT. In a case where the absolute value is determined to be less than the threshold (Step S205: Yes), the process proceeds to Step S206. On the other hand, in a case where the absolute value is determined not to be less than the threshold (Step S205: No), the process proceeds to Step S207.

(Step S206)

The inspection unit 117 determines that the temperature measurement state is normal. Thereafter, the process illustrated in FIG. 12 ends.

(Step S207)

The inspection unit 117 determines that the temperature measurement state is abnormal. Thereafter, the process illustrated in FIG. 12 ends.

As described above, the imaging apparatus 10x according to this embodiment further includes the inspection unit 117 inspecting whether or not the temperature measurement state is normal based on temperatures calculated for a plurality of exposure times.

As the temperature measurement state determined using this configuration is notified, an idea for handling the imaging apparatus 10x, for example, for determining whether to continue imaging or temperature measurement is given to the user.

Third Embodiment

Next, a third embodiment of the present invention will be described. The same reference signs will be assigned to configuration parts the same as those in the embodiments described above, and the description thereof will be incorporated by reference.

A dark current-calculating unit 114 of an imaging apparatus 10x according to this embodiment detects a dark current value based on a difference between the output signals in a plurality of partial areas of each one frame as a difference value between the signal values represented by an output signal of each pixel from a selection unit 113 in predetermined sets. Each partial area is a partial area included in an OB area. The plurality of partial areas are arranged at different positions and do not overlap each other. In addition, the shape of the partial area and the number of pixels arranged in the partial area are common among the plurality of partial areas, and each pixel within one partial area is associated with a pixel within another partial area. The dark current-calculating unit 114 calculates a difference value between the signal values of pixels associated with each other and calculates a noise level based on a distribution of calculated difference values between pixels.

Figure 13:
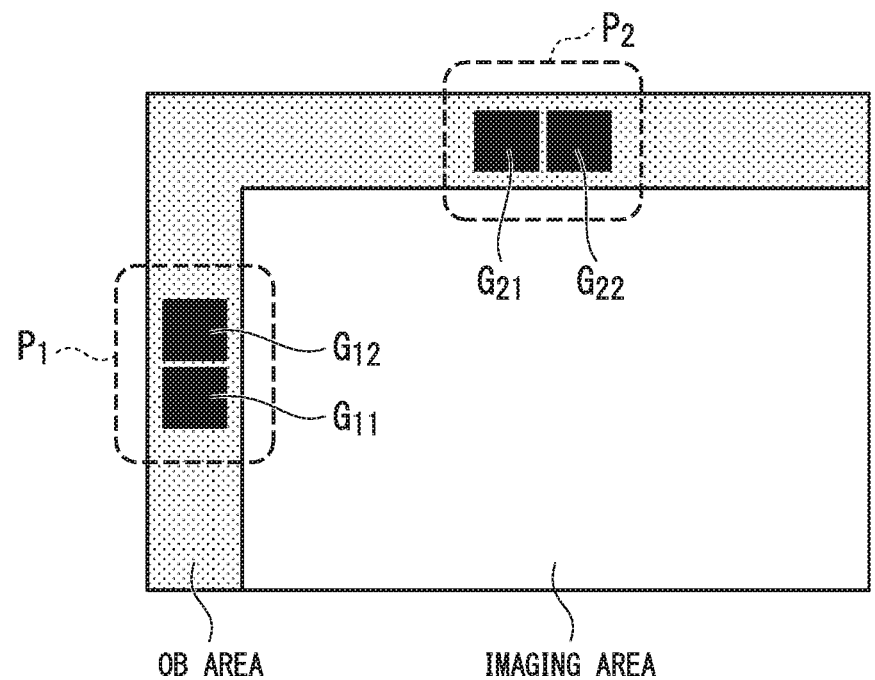
FIG. 13 is a diagram illustrating an example of partial areas according to a third embodiment.

Next, an example of the partial areas according to this embodiment will be described. FIG. 13 is a diagram illustrating an example of partial areas according to this embodiment. In FIG. 13, four partial areas $G_{11}$, $G_{12}$, $G_{21}$, and $G_{22}$ are represented by black squares. A set $P_1$ of partial area formed by the partial areas $G_{11}$ and $G_{12}$ having the same size and the same shape is arranged in a lower-left portion of an OB area. A set $P_2$ of partial area formed by the partial areas $G_{21}$ and $G_{22}$ is arranged in an upper-right portion of an OB area. In each of the sets $P_1$ and $P_2$, two partial areas are arranged to be adjacent to each other. The two partial areas included in each of the sets $P_1$ and $P_2$ are used as partial areas when the dark current-calculating unit 114 calculates a difference value between signal values of pixels associated with each other between partial areas. For this reason, components having a higher correlation when the positions thereof are closer in FPN components included in signal values, in other words, components according to the amounts of electric charge accumulated according to thermal noise depending on the temperatures of the pixels are offset. Here, the shape of each of the partial areas $G_{11}$, $G_{12}$, $G_{21}$, and $G_{22}$ is a square of which the length of one side is close to the width of the OB area. By employing this shape and arrangement, the positions of pixels associated with each other included in partial areas adjacent to each other are close to each other, and the number of pixels included in each partial area can be increased. For this reason, the dark current-calculating unit 114 can calculate a noise level with high accuracy, and a temperature-calculating unit 115 can calculate a temperature with high accuracy. When a different value is calculated, the dark current-calculating unit 114 may use either both sets $P_1$ and $P_2$ of the partial areas or at least one set thereof.

Figure 14:
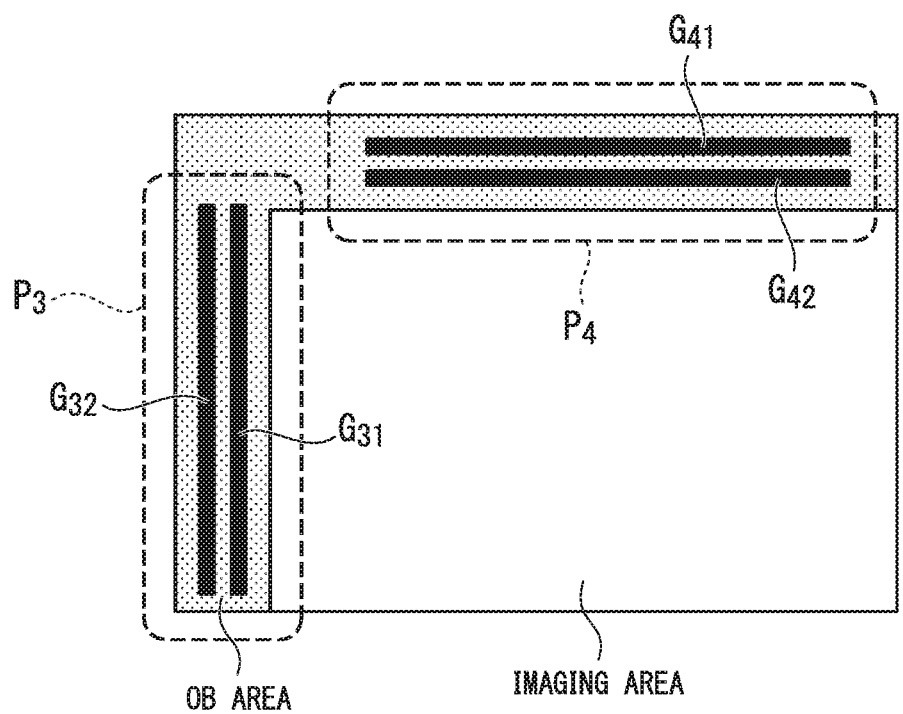
FIG. 14 is a diagram illustrating another example of partial areas according to the third embodiment.

Next, another example of partial areas according to this embodiment will be described. FIG. 14 is a diagram illustrating another example of partial areas according to this embodiment. In FIG. 14, four partial areas $G_{31}$, $G_{32}$, $G_{41}$, and $G_{42}$ are represented by black rectangles. A set $P_3$ of partial area formed by the partial areas $G_{31}$ and $G_{32}$ is arranged in a lower-left portion of an OB area. A set $P_4$ of partial area formed by the partial areas $G_{41}$ and $G_{42}$ is arranged in an upper-right portion of an OB area. In each of the sets $P_3$ and $P_4$, two partial areas having the same size and the same shape are arranged to be adjacent to each other. In the example illustrated in FIG. 14, the length of one side of each of the partial areas $G_{31}$ and $G_{32}$ included in the set $P_3$ is sufficiently larger than the length of the other side and is closer to the length of the left side of the OB area than the width of the OB area. In addition, the partial areas $G_{31}$ and $G_{32}$ face each other parallel to the longitudinal directions thereof and are adjacent to each other. The length of one side of each of the partial areas $G_{41}$ and $G_{42}$ included in the set $P_4$ is sufficiently larger than the length of the other side and is closer to the length of the upper side of the OB area than the width of the OB area. In addition, the partial areas $G_{41}$ and $G_{42}$ face each other in parallel with the longitudinal directions thereof to be adjacent to each other. By employing the shape and the arrangement, the positions of pixels associated with each other included in partial areas adjacent to each other are close to each other, and the number of pixels included in each partial area can be increased. For this reason, the dark current-calculating unit 114 can calculate a noise level with high accuracy, and the dark current value can be calculated with high accuracy based on the noise level. In addition, the temperature-calculating unit 115 can calculate a temperature with high accuracy by using the dark current value. When a noise value is calculated, the dark current-calculating unit 114 may use either both sets $P_3$ and $P_4$ of the partial areas or at least one set thereof.

As described above, in the imaging apparatus 10x according to this embodiment, the dark current-calculating unit 114 calculates a dark current value based on a difference between output signals of pixels belonging to partial areas included in the dark current detection area between partial areas as a difference between output signals of predetermined sets.

According to such a configuration, common signal components between partial areas are offset in the difference between output signals. A dark current value can be calculated with high accuracy based on a noise level depending on a temperature change, and accordingly, the temperature of the imaging device can be measured with high accuracy regardless of the imaging device.

Fourth Embodiment

Next, a fourth embodiment of the present invention will be described. The same reference signs will be assigned to configuration parts the same as those in the embodiments described above, and the description thereof will be incorporated by reference.

A dark current-calculating unit 114 of an imaging apparatus 10x according to this embodiment calculates a noise level by assuming the distribution of a predetermined noise component based on a range of a difference values between signal values, which are represented by output signals of pixels transmitted from a selection unit 113, of a predetermined set. Then, the dark current-calculating unit 114 calculates a dark current value from the calculated noise level.

Next, a process of calculating a noise level according to this embodiment will be described.

Figure 15:
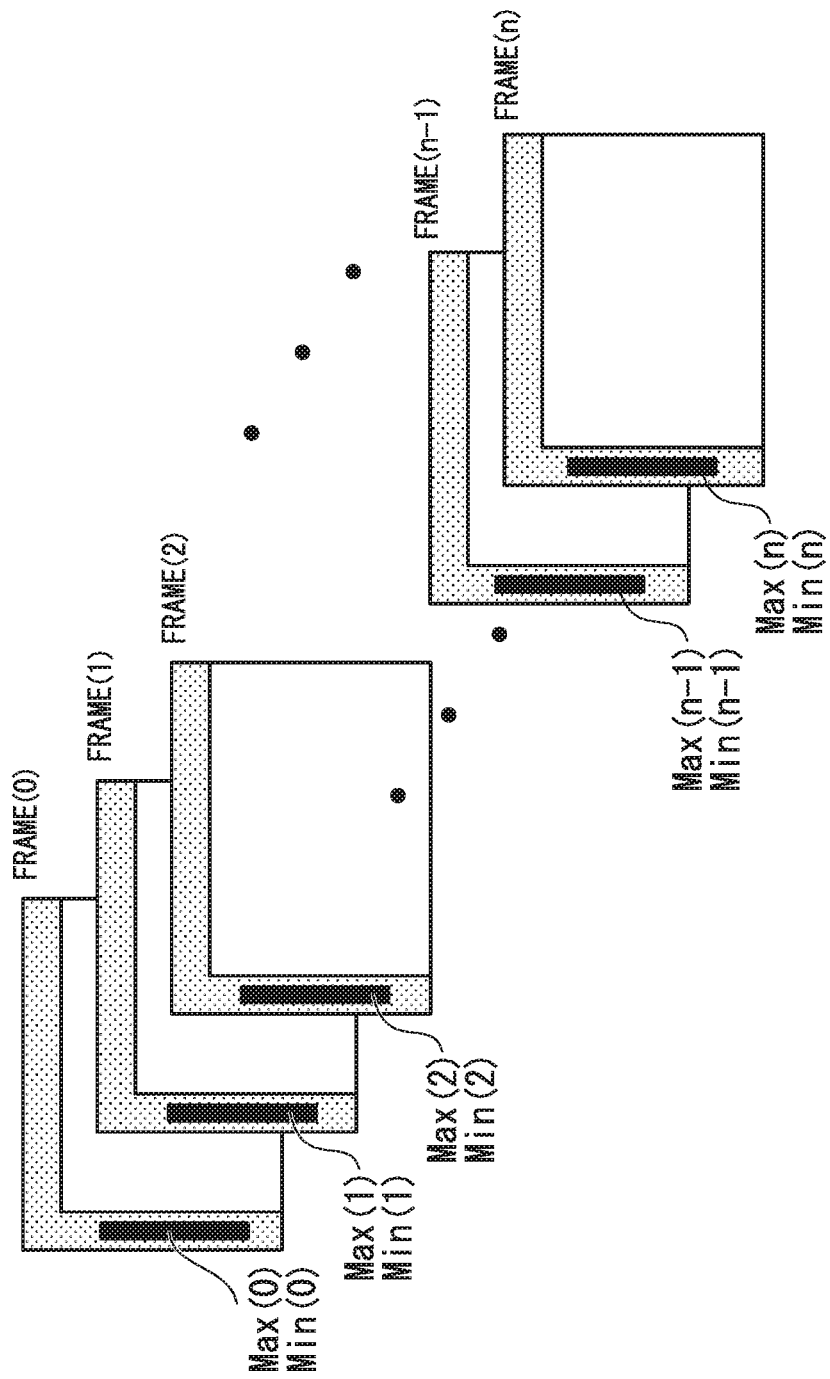
FIG. 15 is a conceptual diagram illustrating an example of a maximum value and a minimum value determined for each frame by a dark current-calculating unit according to a fourth embodiment.

The dark current-calculating unit 114 sets a maximum value [Max] and a minimum value [Min] of the calculation value $V_{CAL}$ for each pixel arranged inside a predetermined partial area of the OB area for each frame. In this embodiment, as illustrated in FIG. 15, at least one partial area may be set in the OB area. The dark current-calculating unit 114 stores maximum values [Max] and minimum values [Min] corresponding to a predetermined number of frames up to the current frame. In the example illustrated in FIG. 15, the dark current-calculating unit 114 stores maximum values [Max] and minimum values [Min] corresponding to (n+1) frames from frame(0) to frame(n). The dark current-calculating unit 114 calculates a representative maximum value [Max'] and a representative minimum value [Min'] by respectively averaging the maximum values Max and the minimum values [Min] that are stored. Then, the dark current-calculating unit 114 calculates a difference between the representative maximum value [Max'] and the representative minimum value [Min'] that are calculated as a range $\Delta V_{CAL}$ of the calculation values $V_{CAL}$ in the partial area.

Figure 16:
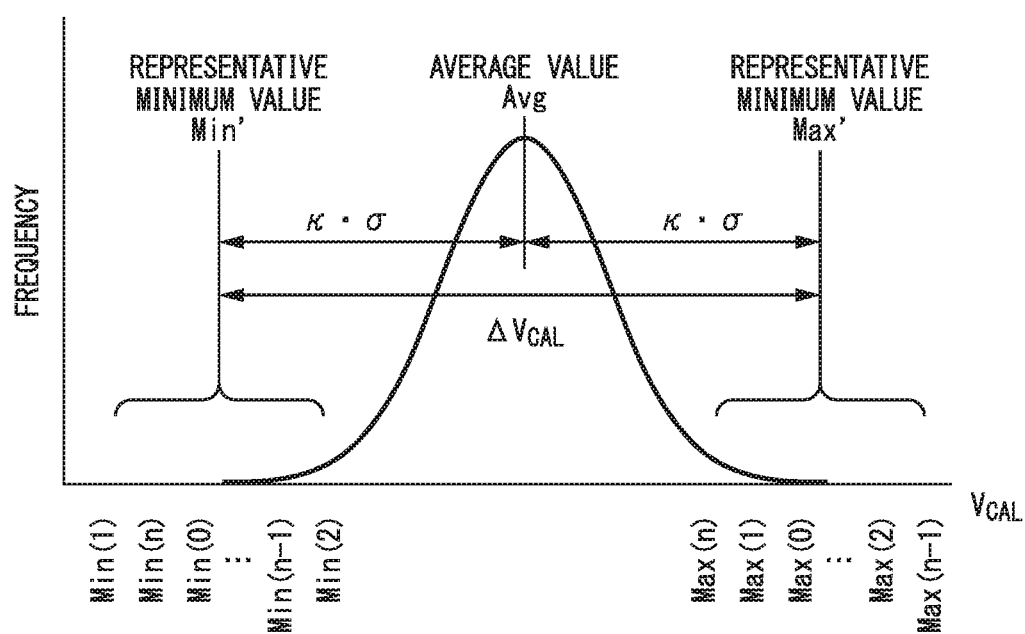
FIG. 16 is a diagram illustrating a relationship between a size of a range and a standard deviation according to the fourth embodiment.

As described above, the distribution of calculation values $V_{CAL}$ among pixels is due to noise according to random processes and thus, approximates to a normal distribution as illustrated in FIG. 16. The dark current-calculating unit 114 divides the range $\Delta V_{CAL}$ by 2·κ to calculate a standard deviation σ of the calculation value $V_{CAL}$ as a noise level $N_{CAL}$ of the calculation value $V_{CAL}$. The coefficient κ is a predetermined positive real number determined according to the number of pixels arranged in a partial area. In other words, the coefficient κ is a deviation value acquired by normalizing the range $\Delta V_{CAL}$ at 2·σ. The representative minimum value [Min'] and the representative maximum value [Max'] representing the range of the calculation value $V_{CAL}$ are values respectively acquired by adding/subtracting κ·σ to/from the average value Avg of the calculation values $V_{CAL}$. Then, the dark current-calculating unit 114 calculates a dark current value $I_D$ from the noise level $N_{CAL}$ calculated using Equation (4).

Figure 17:
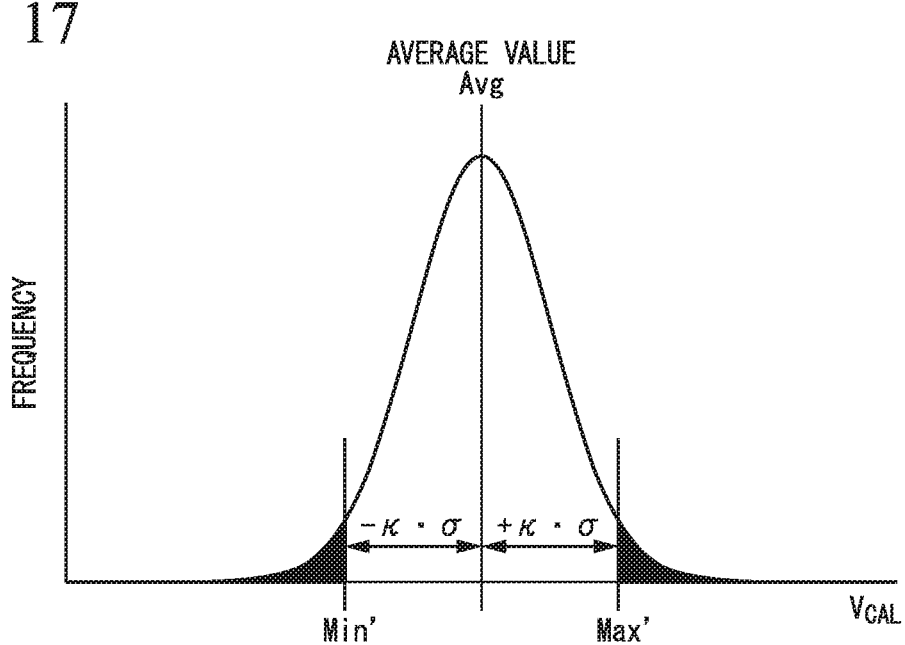
FIG. 17 is a diagram illustrating a relationship between the size of a range and a cumulative frequency according to the fourth embodiment.
Figure 18:
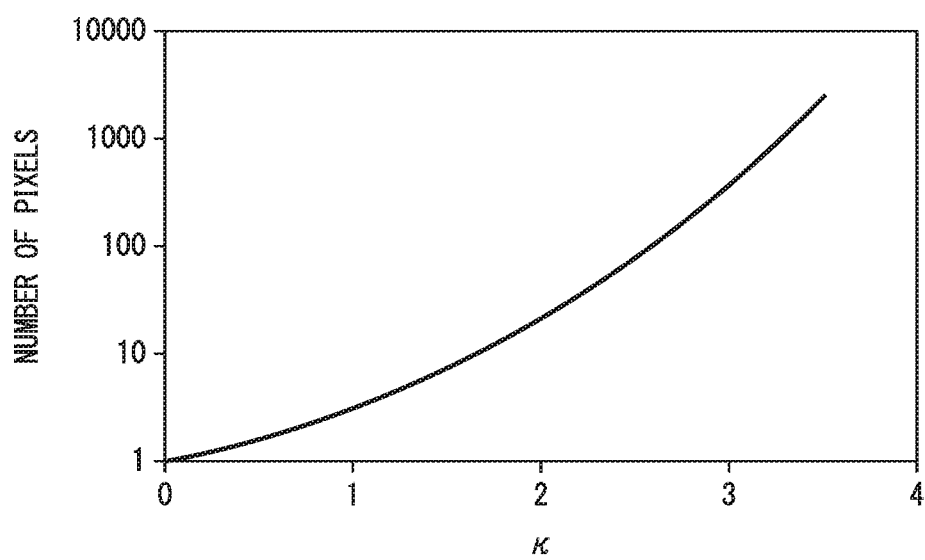
FIG. 18 is a diagram illustrating a relationship between the number of pixels and a coefficient k according to the fourth embodiment.

In this embodiment, the coefficient κ is set such that a probability that the calculation value $V_{CAL}$ is smaller than the representative minimum value [Min'] and a probability that the calculation value $V_{CAL}$ is smaller than the representative maximum value [Max'] are 0.5. In other words, the coefficient κ is a value giving the representative minimum value [Min'] (or the representative maximum value [Max']) having an accumulated frequency, which is acquired by integrating the calculation value $V_{CAL}$ from $-\infty$ to the representative minimum value [Min'] (or from $+\infty$ to the representative maximum value [Max']), of 0.5. In FIG. 17, this accumulated frequency is represented as the area of blackened areas. Thus, as the number of pixels arranged inside the partial area is increased, the coefficient κ becomes larger, and as the number of pixels is decreased, the coefficient κ becomes smaller. When the frequency of the calculation value $V_{CAL}$ is assumed to have a normal distribution, a relationship between the number of pixels and the coefficient κ is given as illustrated in FIG. 18. For example, in a case where the number of pixels is 50, 100, 500, or 1000, the coefficient κ is 2.326, 2.576, 3.090, or 3.291.

In addition, the dark current-calculating unit 114, as the calculation value $V_{CAL}$ of each pixel, may use a difference value between signal values $V_{OUT}$ of a plurality of frames or a difference value between the signal values $V_{OUT}$ of a plurality of partial areas. In addition, the dark current-calculating unit 114, as the representative minimum value [Min'] and the representative maximum value [Max'], may calculate an average value of the minimum values [Min] and an average value of the maximum value [Max] between a plurality of partial areas or sets of partial areas.

As described above, the dark current-calculating unit 114 calculates a noise level of a noise component included in a calculation value from an inter-pixel range of the calculation values based on a difference between output signals of a predetermined set. Then, the dark current-calculating unit 114 calculates a dark current value based on the calculated noise level.

According to this configuration, the noise level of a noise component included in calculation can be calculated from the inter-pixel range of the calculation values through a simple arithmetic operation without performing a complicated arithmetic operation. For this reason, the amount of processing in the temperature measurement can be decreased.

MODIFIED EXAMPLE

As above, while the embodiments of the present invention have been described, various modifications may be made therein within a range not departing from the concept of the present invention.

For example, the imaging apparatus 10x may be fixed to the endoscope apparatus 10 to be detachably attached and configured as an independent imaging apparatus. In addition, the imaging apparatus 10x may include the light source unit 15, and the light source unit 15 may be omitted from the endoscope apparatus 10.

Furthermore, the display unit 13 may be omitted in the endoscope apparatus 10 or the imaging apparatus 10x.

In addition, the control unit 11 according to the third or fourth embodiment may further include the inspection unit 117.

A part of the endoscope apparatus 10 or the imaging apparatus 10x, for example, the control unit 11 may be realized by a computer. In such a case, a program used for realizing the control function may be recorded on a computer-readable recording medium, and the control function may be realized by reading the program recorded on the recording medium into a computer system and executing the read program. The "computer system" described here is a computer system built into the endoscope apparatus 10 or the imaging apparatus 10x and includes an OS and hardware such as peripheral devices. In addition, the "computer-readable recording medium" represents a portable medium such as a flexible disk, a magneto-optical disk, a ROM, or a CD-ROM or a storage device such as a hard disk built into a computer system. Furthermore, the "computer-readable recording medium" may include a medium that dynamically stores the program for a short time such as a communication line in a case where the program is transmitted through a network such as the Internet or a communication line such as a telephone circuit and a medium that stores the program for a predetermined time such as a volatile memory arranged inside a computer system serving as a server or a client in such a case. In addition, the program may be used for realizing a part of the functions described above or may realize the functions described above in combination with another program that is already recorded in the computer system.

In addition, a part or the whole of the endoscope apparatus 10 or the imaging apparatus 10x according to the embodiment described above may be realized by an integrated circuit of a large scale integration (LSI) or the like. Each functional block of the endoscope apparatus 10 or the imaging apparatus 10x may be individually configured as a processor, or a part or the whole thereof may be integrated as one processor. In addition, the integration circuit technique is not limited to an LSI and a dedicated circuit or a general-purpose processor may be used for the realization. Furthermore, if an integration circuit technology replacing an LSI emerges as a semiconductor technology progresses, an integrated circuit using this technology may be used.

As above, while preferred embodiments of the present invention have been described, the present invention is not limited to the embodiments and modified examples thereof. In addition, in a range not departing from the concept of the present invention, addition of corrections, omissions, substitutions, and any other changes can be made.

The present invention is not limited by the description presented above and is limited only by the attached claims.

INDUSTRIAL APPLICABILITY

According to the imaging apparatus, the endoscope apparatus, and the temperature-measuring method according to each embodiment described above, while random noise components included in output signals of pixels belonging to a dark current detection area of an imaging device are not offset in a difference between output signals, common signal components are offset between predetermined sets. Since a dark current value can be calculated with high accuracy based on a noise level depending on a temperature change, the temperature of the imaging device can be measured with high accuracy regardless of the imaging device.

The invention claimed is:

1. An imaging apparatus, comprising:
an image sensor configured to perform a photoelectric conversion of collected light; and
a controller configured to:
select output signals from pixels belonging to a predetermined pixel area of the imaging device;
calculate a dark current value based on a difference between the output signals in a predetermined set;
set a plurality of different exposure times for the imaging device;
calculate a temperature of the imaging device using the dark current value; and
determine that a temperature measurement state is normal when a different between temperatures calculated for the plurality of different exposure times by the temperature-calculating unit is less than a predetermined threshold.

2. The imaging apparatus according to claim 1, wherein the controller is configured to calculate a dark current value based on a difference between the output signals in frames as the difference between the output signals in the predetermined set.

3. The imaging apparatus according to claim 2, wherein the controller is configured to calculate a dark current value based on a difference between an output signal value in one frame and an average value of the output signals in a plurality of other frames as the difference between the output signals in frames.

4. The imaging apparatus according to claim 1, wherein the controller is configured to calculate a dark current value based on a difference between the output signals that is output from pixels belonging to partial areas included in the predetermined pixel area as the difference between the output signals in the predetermined set.

5. The imaging apparatus according to claim 1, wherein the controller is configured to calculate a level of a noise component included in the difference from a range of values relating to the difference in pixels and calculates the dark current value based on the level.

6. The imaging apparatus according to claim 1, wherein the controller is configured to calculate a temperature corresponding to the dark current value detected by the dark current-calculating unit as a temperature of the imaging device based on a dark current temperature table representing a relationship between the dark current value and the temperature.

7. The imaging apparatus according to claim 1, the controller is configured to set the plurality of exposure times for the imaging device to be longer than an exposure time during imaging.

8. The imaging apparatus according to claim 1, wherein the predetermined pixel area is an optical black area that is an area in which the collected light is blocked, and the controller is configured to select the output signals that is output from pixels belonging to the optical black area.

9. An endoscope apparatus, comprising the imaging apparatus according to claim 1.

10. A temperature-measuring method, comprising:
selecting output signals from pixels belonging to a predetermined pixel area of an imaging device performing a photoelectric conversion of collected light;
calculating a dark current value based on a difference between the output signals in a predetermined set;
setting a plurality of different exposure times for the imaging device;
calculating a temperature of the imaging device from the dark current value; and
determining that a temperature measurement state is normal when a difference between temperatures calculated for a plurality of the exposure times is less than a predetermined threshold in the calculating of a temperature.

* * * * *